US011591084B2

(12) United States Patent
Benedict et al.

(10) Patent No.: US 11,591,084 B2
(45) Date of Patent: Feb. 28, 2023

(54) CYCLOIDAL ROTOR MICRO-AIR VEHICLE

(71) Applicant: The Texas A&M University System, College Station, TX (US)

(72) Inventors: Moble Benedict, College Station, TX (US); Carl C. Runco, College Station, TX (US); David A. Coleman, College Station, TX (US)

(73) Assignee: The Texas A&M University System, College Station, TX (US)

( * ) Notice: Subject to any disclaimer, the term of this patent is extended or adjusted under 35 U.S.C. 154(b) by 724 days.

(21) Appl. No.: 16/473,698

(22) PCT Filed: Jan. 3, 2018

(86) PCT No.: PCT/US2018/012231
§ 371 (c)(1),
(2) Date: Jun. 26, 2019

(87) PCT Pub. No.: WO2018/140199
PCT Pub. Date: Aug. 2, 2018

(65) Prior Publication Data
US 2019/0337616 A1 Nov. 7, 2019

Related U.S. Application Data
(60) Provisional application No. 62/441,719, filed on Jan. 3, 2017.

(51) Int. Cl.
*B64C 39/00* (2006.01)
*B64F 5/10* (2017.01)
(Continued)

(52) U.S. Cl.
CPC ............ *B64C 39/005* (2013.01); *B64C 27/52* (2013.01); *B64C 39/024* (2013.01);
(Continued)

(58) Field of Classification Search
CPC ..... B64C 39/005; B64C 27/52; B64C 39/024; B64C 39/028; B64C 2201/108; B64C 2201/165; B64F 5/10
See application file for complete search history.

(56) References Cited

U.S. PATENT DOCUMENTS

| | | | | |
|---|---|---|---|---|
| 1,754,977 A | * | 4/1930 | Bergman | ............... B64C 39/005 244/20 |
| 2,123,916 A | * | 7/1938 | Rohrbach | ............. B64C 39/005 244/20 |

(Continued)

FOREIGN PATENT DOCUMENTS

WO     2009/006689 A1     1/2009

OTHER PUBLICATIONS

PCT/US2018/012231 International Search Report and Written Opinion dated Aug. 17, 2018 (14 p.).

*Primary Examiner* — Medhat Badawi
(74) *Attorney, Agent, or Firm* — Conley Rose, P.C.

(57) ABSTRACT

A cycloidal rotor air vehicle includes an airframe, a first cycloidal rotor assembly supported by the airframe and configured to rotate about a first axis of rotation relative to the airframe, the first cycloidal rotor assembly including a blade having a longitudinal axis oriented parallel to the first axis of rotation, a first motor configured to rotate the first cycloidal rotor assembly about the first axis of rotation, a first servo coupled to the blade of the first cycloidal rotor assembly and configured to adjust the pitch of the blade, and a control system supported on the airframe and configured to control the operation of the first motor and the first servo.

20 Claims, 21 Drawing Sheets

(51) Int. Cl.
*B64C 27/52* (2006.01)
*B64C 39/02* (2023.01)

(52) U.S. Cl.
CPC .............. *B64C 39/028* (2013.01); *B64F 5/10* (2017.01); *B64C 2201/108* (2013.01); *B64C 2201/165* (2013.01)

(56) References Cited

U.S. PATENT DOCUMENTS

| | | | | |
|---|---|---|---|---|
| 2,413,460 A * | 12/1946 | Main | B64C 39/005 | 416/116 |
| 2,507,657 A * | 5/1950 | Wiessler | B64C 39/005 | 244/20 |
| 2,580,428 A * | 1/1952 | Heuver | B64C 39/005 | 416/111 |
| 2,980,186 A * | 4/1961 | Strong | B64C 27/605 | 416/115 |
| 3,260,312 A * | 7/1966 | Elmer | F04D 29/329 | 416/240 |
| 3,326,619 A * | 6/1967 | Johnson | F41G 3/22 | 250/203.1 |
| 4,138,661 A * | 2/1979 | McAdams, Jr. | G05D 1/0808 | 340/975 |
| 4,194,707 A * | 3/1980 | Sharpe | B64C 29/0016 | 416/111 |
| 4,210,299 A * | 7/1980 | Chabonat | B64C 39/005 | 416/111 |
| 4,482,110 A * | 11/1984 | Crimmins, Jr. | B64B 1/06 | 416/111 |
| 5,100,080 A * | 3/1992 | Servanty | B64C 39/005 | 440/93 |
| 5,265,827 A * | 11/1993 | Gerhardt | B64C 39/005 | 244/70 |
| 5,799,901 A * | 9/1998 | Osder | G05D 1/0858 | 416/114 |
| 5,810,562 A * | 9/1998 | Byrnes | B64C 27/605 | 416/114 |
| 5,951,608 A * | 9/1999 | Osder | G05D 1/0858 | 701/5 |
| 6,007,021 A * | 12/1999 | Tsepenyuk | B64C 29/0033 | 416/126 |
| 6,505,115 B2* | 1/2003 | Morizet | G08G 5/0095 | 701/120 |
| 6,885,917 B2* | 4/2005 | Osder | B64C 27/18 | 244/175 |
| 6,932,296 B2* | 8/2005 | Tierney | B64C 39/024 | 244/19 |
| 6,938,853 B2* | 9/2005 | Pines | B64C 33/02 | 244/22 |
| 7,219,854 B2* | 5/2007 | Boschma, Jr. | B64C 11/006 | 180/117 |
| 7,264,202 B2* | 9/2007 | Sullivan | B64B 1/32 | 244/96 |
| 7,284,420 B2* | 10/2007 | Rouse | G01P 5/14 | 73/180 |
| 7,370,828 B2* | 5/2008 | Stephens | B64C 39/008 | 244/9 |
| 7,461,811 B2* | 12/2008 | Milde, Jr. | B64C 29/0033 | 244/12.3 |
| 7,651,051 B2* | 1/2010 | Agrawal | B64C 33/02 | 244/22 |
| 7,686,583 B2* | 3/2010 | Siegel | F03B 17/067 | 416/111 |
| 7,762,776 B2* | 7/2010 | Siegel | B63H 1/08 | 440/93 |
| 7,988,089 B2* | 8/2011 | Wittmer | B64C 27/605 | 244/228 |
| 8,528,855 B2* | 9/2013 | Seifert | B64C 39/005 | 244/70 |
| 8,540,485 B2* | 9/2013 | Bogrash | F03D 5/04 | 416/17 |
| 9,061,762 B2* | 6/2015 | Vetter | B64C 29/0008 | |
| 9,346,535 B1* | 5/2016 | Adams | B64C 39/005 | |
| 9,382,003 B2* | 7/2016 | Burema | A01C 21/00 | |
| 9,856,002 B1* | 1/2018 | Nadeau | B63B 35/34 | |
| 9,977,457 B2* | 5/2018 | Gomolko | B64C 13/0421 | |
| 10,087,910 B2* | 10/2018 | Mandre | F03B 17/06 | |
| 10,279,900 B2* | 5/2019 | Robertson | B64C 27/06 | |
| 10,293,931 B2* | 5/2019 | Robertson | B64C 5/02 | |
| 10,384,776 B2* | 8/2019 | Choi | B64D 27/26 | |
| 10,442,525 B2* | 10/2019 | Bogrash | B64C 11/18 | |
| 10,814,967 B2* | 10/2020 | Groninga | B64C 25/52 | |
| 10,822,079 B2* | 11/2020 | Schwaiger | B64C 11/006 | |
| 10,994,840 B1* | 5/2021 | Adams | B63G 8/08 | |
| 11,198,507 B2* | 12/2021 | Bogrash | B64C 39/005 | |
| 2002/0068138 A1* | 6/2002 | Kasahara | B29C 66/1122 | 428/36.91 |
| 2004/0216805 A1* | 11/2004 | Teufel | B64F 5/10 | 141/369 |
| 2005/0097719 A1* | 5/2005 | Teufel | B29C 33/505 | 29/700 |
| 2006/0226280 A1* | 10/2006 | Alman | B64C 39/024 | 244/903 |
| 2007/0215747 A1* | 9/2007 | Siegel | B64C 11/006 | 244/9 |
| 2008/0311806 A1* | 12/2008 | Mead | B63B 39/06 | 441/74 |
| 2009/0317252 A1* | 12/2009 | Garcin | B64C 13/30 | 416/114 |
| 2010/0140404 A1* | 6/2010 | Maxwell | B29C 70/086 | 244/123.1 |
| 2013/0017083 A1* | 1/2013 | Graham | F03D 3/061 | 416/1 |
| 2013/0320133 A1* | 12/2013 | Ratti | B64C 33/025 | 244/22 |
| 2014/0061379 A1* | 3/2014 | Campolo | B64C 39/028 | 244/72 |
| 2015/0307191 A1* | 10/2015 | Samuel | B64C 33/02 | 244/22 |
| 2016/0031554 A1* | 2/2016 | Eshkenazy | B64C 39/024 | 244/6 |
| 2016/0185455 A1* | 6/2016 | Deng | B60L 1/00 | 310/38 |
| 2016/0229518 A1* | 8/2016 | Kempshall | B64C 3/44 | |
| 2017/0130643 A1* | 5/2017 | Williams | B29C 70/345 | |
| 2017/0327218 A1* | 11/2017 | Morin | B64C 39/024 | |
| 2019/0100302 A1* | 4/2019 | Ulrich | B64C 27/82 | |
| 2019/0337616 A1* | 11/2019 | Benedict | B64C 39/005 | |
| 2021/0061482 A1* | 3/2021 | Ulrich | B64C 39/024 | |
| 2021/0134710 A1* | 5/2021 | Kubouchi | H01L 23/49811 | |

* cited by examiner

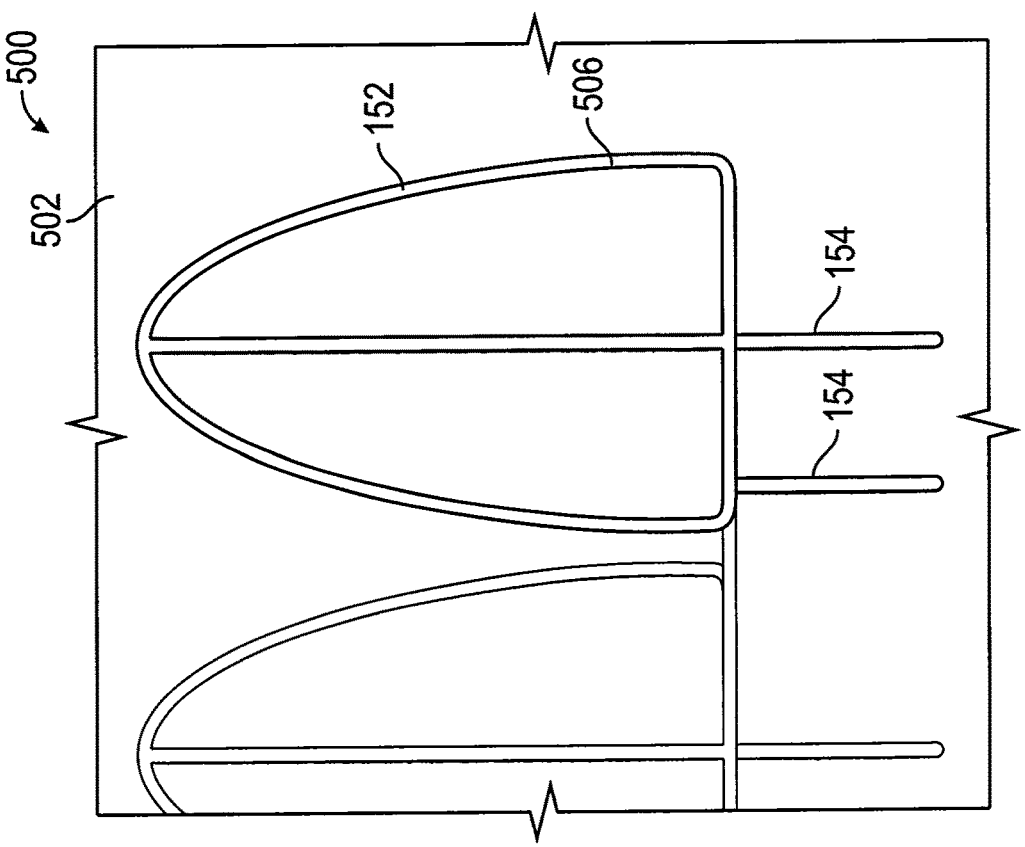
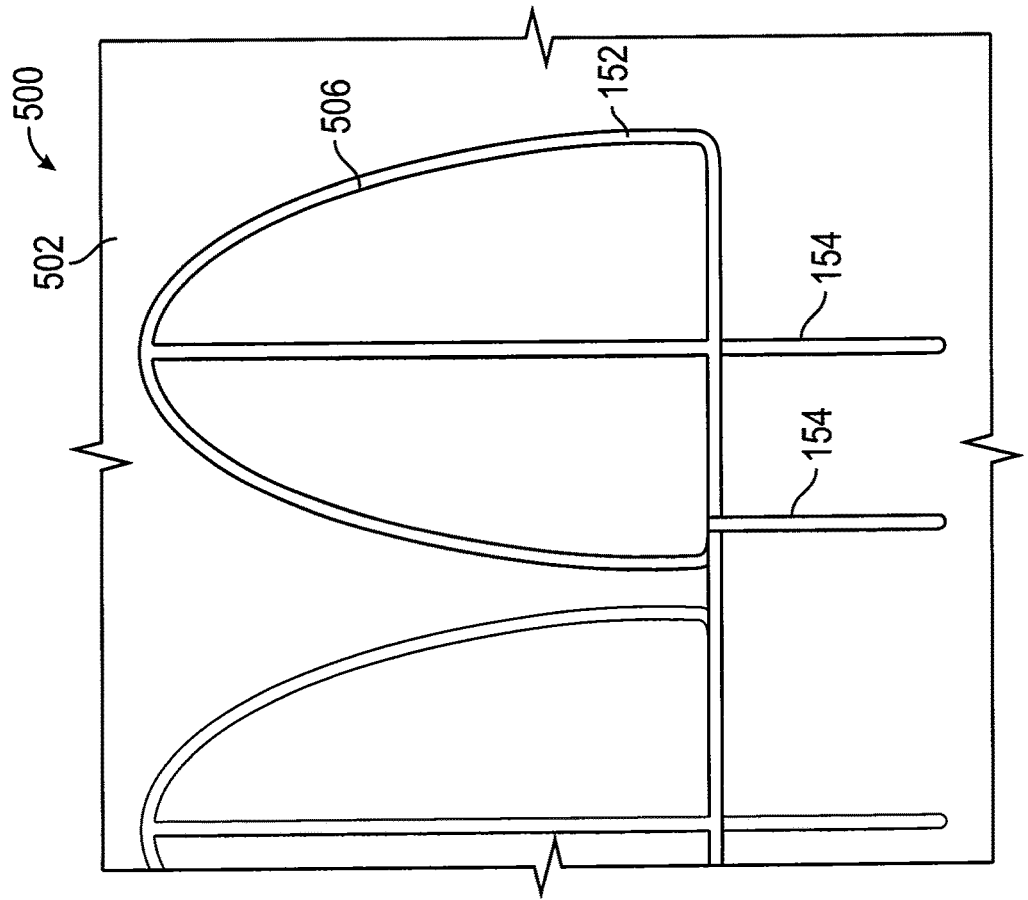

CYCLOIDAL ROTOR MICRO-AIR VEHICLE

CROSS-REFERENCE TO RELATED APPLICATIONS

This application is a 35 U.S.C. § 371 national stage application of PCT/US2018/012231 filed Jan. 3, 2018, and entitled "Cycloidal Rotor Micro-Air Vehicle," which claims benefit of U.S. provisional patent application Ser. No. 62/441,719 filed Jan. 3, 2017, and entitled "Cycloidal Rotor Micro-Air Vehicle," each of which is hereby incorporated herein by reference in its entirety for all purposes.

STATEMENT REGARDING FEDERALLY SPONSORED RESEARCH OR DEVELOPMENT

This invention was made with government support under W911nf-08-2-0004 awarded by the Army Research Lab. The government has certain rights in the invention.

BACKGROUND

Over the past decade there has been increased interest in developing different types of micro-air vehicles (MAVs), largely because of the potential mission capabilities associated with small-scale flying devices. In some applications, such miniature, lightweight vehicles may offer superior portability, rapid deployment capability, and a low radar cross section. MAVs may further support tactical military operations or explore environments that would otherwise be too dangerous for a human, such as surveillance and reconnaissance in the battlefield, biochemical sensing, fire and rescue operations, border surveillance, and traffic monitoring. With the possibility of reduced noise signatures and lower production costs, MAVs may accomplish at least some of these types of tasks. However, these missions often require flying conditions outside of the flight capabilities of current systems and factors such as gusts, confined spaces, and increased flight times are prohibitive barriers to most MAVs in use today. To overcome these difficulties, flying platforms could be developed capable of navigating through these scenarios and designed to exhibit high gust tolerance and the ability to operate in confined spaces. To date, many small, fixed-wing MAVs have been developed, however these types of flying devices are generally unsuitable for missions which require hovering/low-speed flight or tight turns and other demanding maneuvers.

Rotorcraft, on the other hand, may be more suited for these flight regimes, with most vehicles employing single, coaxial, or multi-rotor configurations. Generally, a primary aerodynamic limitation of conventional rotor blade designs for use in MAVs is the reduced efficiencies at low Reynold's numbers (10,000-50,000), in particular, low values of maximum figure of merit of around 0.65. In some instances, the reduced aerodynamic performance is caused by the large values of profile drag associated with thick boundary layer formations on the blades, large induced losses, and higher rotational and turbulent losses in the downstream wake of the rotating blades.

BRIEF SUMMARY OF THE DISCLOSURE

An embodiment of a cycloidal rotor air vehicle comprises an airframe, a first cycloidal rotor assembly supported by the airframe and configured to rotate about a first axis of rotation relative to the airframe, the first cycloidal rotor assembly comprising a blade having a longitudinal axis oriented parallel to the first axis of rotation, a first motor configured to rotate the first cycloidal rotor assembly about the first axis of rotation, a first servo coupled to the blade of the first cycloidal rotor assembly and configured to adjust the pitch of the blade, and a control system supported on the airframe and configured to control the operation of the first motor and the first servo. In some embodiments, the cycloidal rotor air vehicle has a total mass less than 200 grams. In some embodiments, the cycloidal rotor air vehicle further comprises an offset link coupled to the first servo, and a pitch link coupled to the offset link and the blade of the first cycloidal rotor assembly, wherein the pitch link is configured to adjust the pitch of the blade in response to rotation of the offset link by the first servo. In certain embodiments, the blade of the first cycloidal rotor assembly comprises a material formed from unidirectional pre-impregnated carbon fiber. In certain embodiments, the blade of the first cycloidal rotor assembly comprises a frame including a central main spar and semi-elliptical outer frame, and a Mylar skin covering the frame. In some embodiments, the cycloidal rotor air vehicle further comprises a second cycloidal rotor assembly supported by the airframe and configured to rotate about a second axis of rotation relative to the airframe, wherein the second cycloidal rotor assembly comprises a blade having a longitudinal axis oriented parallel to the second axis of rotation of the second cycloidal rotor assembly, a second motor configured to rotate the second cycloidal rotor assembly about the second axis of rotation, and a second servo coupled to the blade of the second cycloidal rotor assembly and configured to adjust the pitch of the blade of the second cycloidal rotor assembly. In some embodiments, the second axis of rotation is coaxial with the first axis of rotation. In certain embodiments, the cycloidal rotor air vehicle further comprises a tail rotor assembly coupled to the airframe and configured to counter-balance pitch torque generated by the first cycloidal rotor assembly and the second cycloidal rotor assembly, wherein the first motor is configured to rotate the first cycloidal rotor assembly in a first rotational direction about the first axis of rotation, wherein the second motor is configured to rotate the second cycloidal rotor assembly in the first rotational direction about the second axis of rotation. In certain embodiments, the first cycloidal rotor assembly comprises four blades, wherein each blade of the first cycloidal rotor assembly has a longitudinal axis oriented parallel to the first axis of rotation.

An embodiment of a cycloidal rotor air vehicle comprises an airframe, a first cycloidal rotor assembly supported by the airframe and configured to rotate about a first axis of rotation, the first cycloidal rotor assembly comprising a blade having a longitudinal axis parallel with of the first cycloidal rotor assembly, and a first motor configured to rotate the first cycloidal rotor assembly about the first axis of rotation, wherein the blade of the first cycloidal rotor assembly comprises a material formed from unidirectional pre-impregnated carbon fiber. In some embodiments, the blade of the first cycloidal rotor assembly comprises a frame including a central main spar and semi-elliptical outer frame, and a Mylar skin covering the frame. In some embodiments, the cycloidal rotor air vehicle further comprises a first servo coupled to the blade of the first cycloidal rotor assembly and configured to adjust the pitch of the blade, and a control system supported on the airframe and configured to control the operation of the first motor and the first servo. In certain embodiments, the cycloidal rotor air vehicle further comprises an offset link coupled to the first servo, and a pitch link extending between the offset link and the blade of the first cycloidal rotor assembly, wherein the pitch link is configured to adjust the pitch of the blade in response to rotation of the offset link by the first servo. In certain embodiments, the control system is configured to provide on-board inner loop feedback using a proportional-derivative controller. In some embodiments, the cycloidal rotor air vehicle further comprises a tail rotor assembly coupled to the airframe and configured to counter-balance pitch torque generated by the first cycloidal rotor assembly.

An embodiment of a method for forming a cycloidal rotor air vehicle comprises (a) laying a strip of unidirectional pre-impregnated carbon fiber onto a mold, (b) clamping first and second plates against the pre-impregnated carbon fiber to push the pre-impregnated carbon fiber into the mold, and (c) curing the pre-impregnated carbon fiber in the mold to form a rotor blade of the cycloidal rotor air vehicle. In some embodiments, the mold is formed from polytetrafluoroethylene. In some embodiments, the method further comprises (d) placing a silicone mat onto the mold to distribute pressure across the pre-impregnated carbon fiber following (b). In certain embodiments, the method further comprises (d) pivotably coupling the rotor blade to a rotor assembly of the cycloidal rotor air vehicle with a pitch linkage, (e) coupling a servo to the rotor assembly to control the pitch of the rotor blade, and (f) coupling a motor to the rotor assembly to rotate the rotor assembly about an axis of rotation. In some embodiments, the mold comprises a polytetrafluoroethylene female mold half and a silicon male mold half.

BRIEF DESCRIPTION OF THE DRAWINGS

For a detailed description of the disclosed embodiments included in the disclosure, reference will now be made to the accompanying drawings in which:

FIGS. 9-11 are front views of an embodiment of a mold of the molding system of FIG. 8;

DETAILED DESCRIPTION OF THE DISCLOSED EMBODIMENTS

Figure 1:
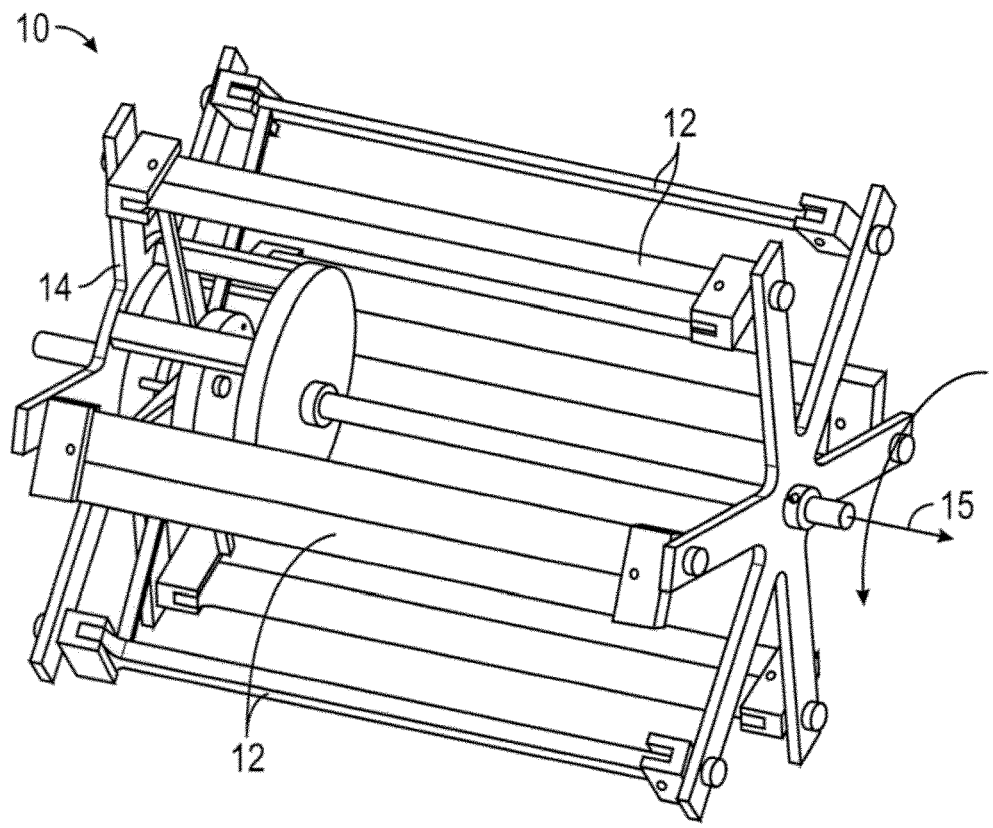
FIG. 1 is a perspective view of a cycloidal rotor model.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 2:
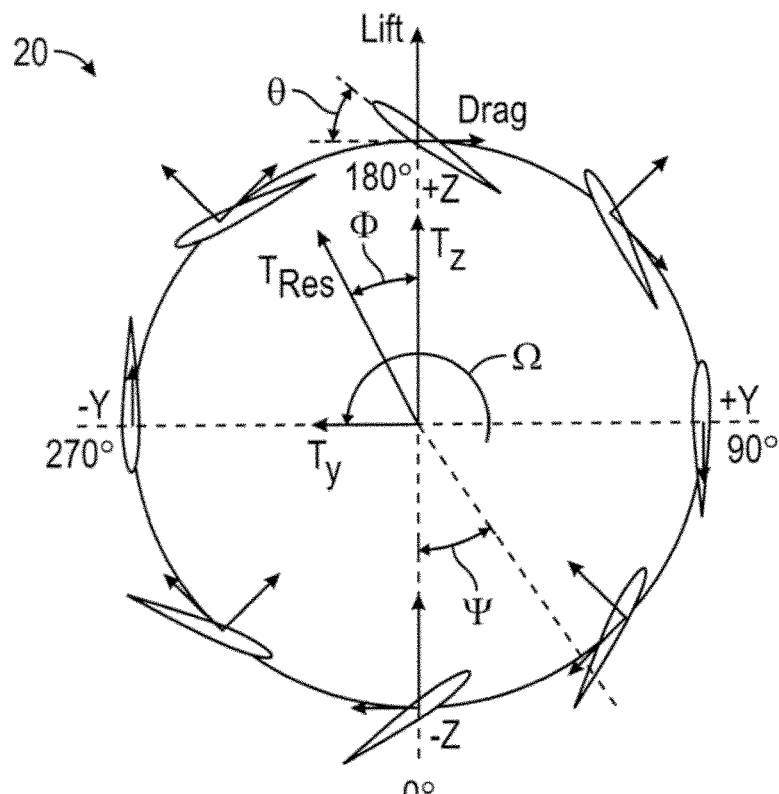
FIG. 2 is a diagram illustrating blade kinematics and forces on the cycloidal rotor model of FIG. 1.
Figure 3:
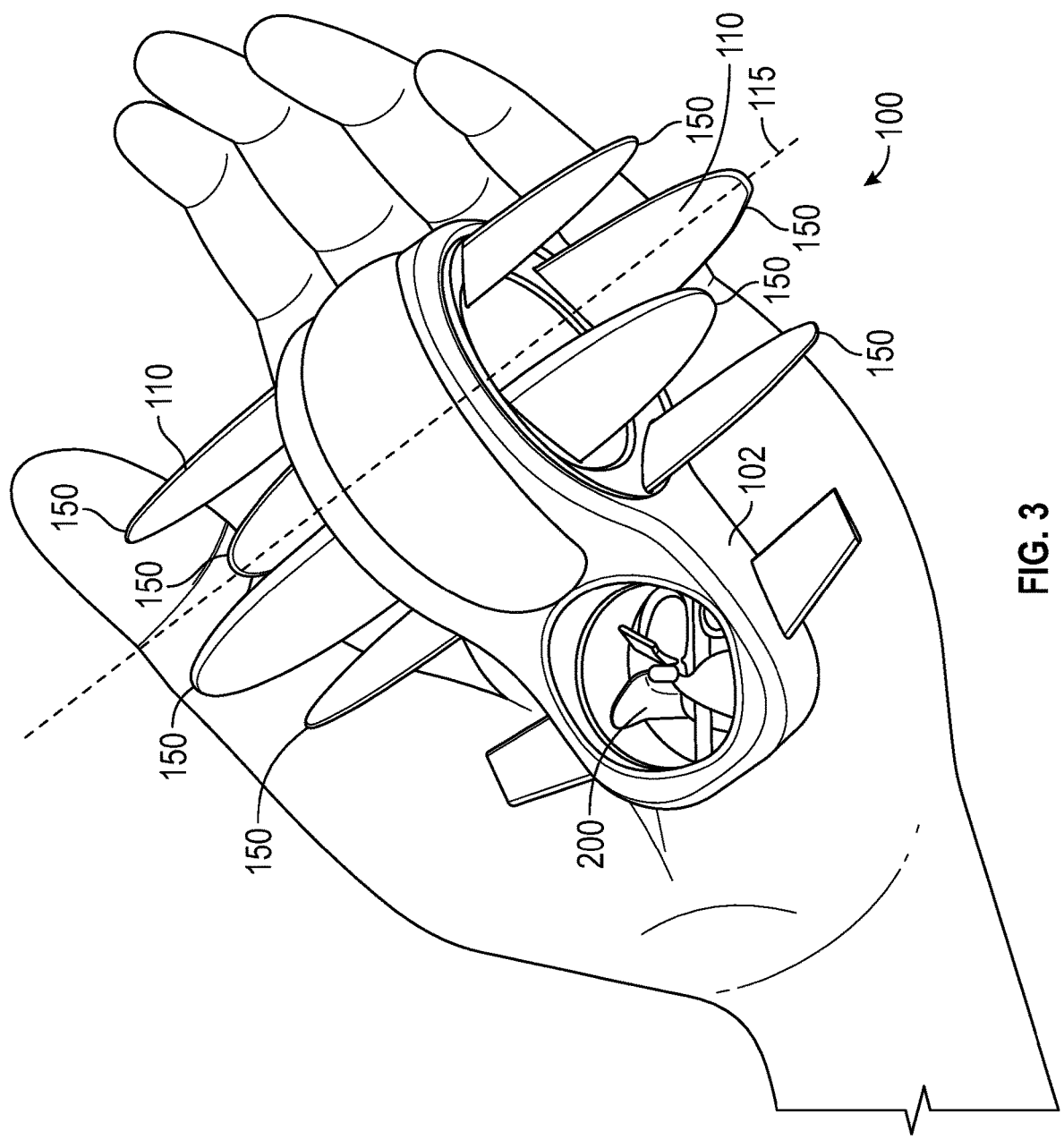
FIG. 3 is a perspective view of an embodiment of a cycloidal rotor MAV in accordance with the principles disclosed herein.

Referring to FIGS. 1 and 2, an embodiment of a cycloidal rotor or cyclorotor model 10 (shown in FIG. 1) generally comprises a vertical take-off and landing (VTOL) propulsion concept that includes several blades 12 configured for rotation about a horizontal axis 15 with the blade span of each blade 12 oriented parallel to the axis of rotation 15. The pitch angle of each of the blades 12 is varied periodically as the blade 12 moves around the azimuth of a rotor 14 such that each blade 12 is at a positive geometric angle of attack (e.g., the angle formed between the chord line of the blade 12 and the and the vector of relative motion between the blade 12 and the fluid through which the blade 12 travels) both at the top and bottom halves of the circular trajectory of the blade 12. The blade kinematics (e.g., of blades 12 of cyclorotor model 10) and aerodynamic forces on a functioning cycloidal rotor are shown particularly in the blade kinematics model 20 shown in FIG. 2. Here, θ is the pitch angle of each blade relative to the direction of travel of the blade, ϕ represents the direction of resultant or net thrust vector from vertical, and Ω is the rotational speed of the rotor (e.g., rotor 14 of cyclorotor model 10). By varying both the rotational speed and the cyclic pitch phasing, the magnitude and direction of the net thrust vector of the rotor can be carefully controlled.

Referring now to FIGS. 3-7, an embodiment of a cycloidal rotor air vehicle or MAV 100 is shown. In the embodiment shown in FIGS. 3-7, cycloidal rotor MAV 100 generally includes an airframe 102, a pair of cycloidal rotor assemblies 110 extending from opposite lateral sides of airframe 102, a tail rotor assembly 200, a control system or autopilot 300 (shown in FIG. 4), a motor 402 (shown in FIG. 4) for each cycloidal rotor assembly 110, a servo 404 (shown in FIG. 4) for each cycloidal rotor assembly 110, a power supply 406 (shown in FIG. 4), and landing gear 408 (shown in FIG. 4). Although cycloidal rotor MAV 100 and its various components may be shown at particular scales in FIGS. 3-7, as well as other Figures of this application, cycloidal rotor MAV 100 and its associated components may comprise varying scales, sizes, shapes, and weights. As will be discussed further herein, cycloidal rotor MAV 100 may provide several advantages over conventional rotors, including the fact that all the spanwise elements of the blades 150 of cycloidal rotor assemblies 110 operate at the same aerodynamic conditions, which allows all the blade elements along the blade span to be set at optimum condition. This is in contrast with conventional rotors, in which each blade element along the span experiences a different flow velocity, Reynold's number, and angle of attack. Additionally, cycloidal rotor assemblies 110 of cycloidal rotor MAV 100 may be more aerodynamically efficient in terms of power loading (thrust per unit power) than a conventional rotor of the same scale and similar actuator area.

Additionally, cycloidal rotor assemblies 110 of cycloidal rotor MAV 100 may be able to obtain the required thrust at a significantly lower rotational speed than an equivalent conventional rotor, and therefore comprise a reduced acoustic signature, making it further advantageous for reconnaissance missions. Further, in the embodiment shown in FIGS. 3-7, the blades 150 of cycloidal rotor assemblies 110 are cyclically pitched once per revolution (1/rev), thereby possibly causing unsteady flow mechanisms to delay blade stall onset and in turn possibly augmenting the lift produced by the blades 150. In addition, the thrust vector of cycloidal rotor assemblies 110 can be instantaneously set to any direction perpendicular to a rotational axis 115 of each rotor assembly 110, thereby allowing cycloidal rotor MAV 100 to possibly also have better maneuverability compared to a conventional rotor based MAV, further demonstrating its usefulness in highly constrained applications and indoor operations.

In the embodiment shown in FIGS. 3-7, cycloidal rotor MAV 100 comprises a meso-scale cyclocopter having an overall weight and size that is approximately an order of magnitude smaller than smallest existing cyclocopters. Additionally, this embodiment of cycloidal rotor MAV 100 is generally configured to provide greater maneuverability, stealth capability, and portability, beyond that offered by existing larger-scale cyclocopters. In this manner, the cycloidal rotor MAV 100 shown in FIGS. 3-7 comprises a versatile hand-held flying device. Developing such an unconventional vehicle at these small scales is a brand new challenge not only from a vehicle design/construction standpoint, but also because it requires more fundamental research to be conducted to understand the three-dimensional unsteady aerodynamics (due to the low aspect ratio of the blades and high reduced frequencies) at ultralow Reynolds numbers experienced by the blades. Also, at small scales, owing to the lower inertia, vehicle dynamics tends to be much faster requiring high-bandwidth closed-loop control with very minimal actuator delays.

In the embodiment shown in FIGS. 3-7, cycloidal rotor assemblies 110 of cycloidal rotor MAV 100 each include an approximately 1" radius, and each weighing 3 grams total and are capable of producing more than 10 grams of thrust; however, in other embodiments, the size, weight, and thrust provided by cycloidal rotor assemblies 110 of cycloidal rotor MAV 100 may vary. In the configuration shown in FIGS. 3-7, cycloidal rotor MAV 100 comprises a twin-cyclocopter. Tail rotor assembly 200 of cycloidal rotor MAV 100, powered by a tail rotor motor 202 (shown in FIG. 4), is incorporated in order to counteract the nose-up reaction pitching moment produced by the two cycloidal rotor assemblies 110 rotating in the same direction when cycloidal rotor MAV 100 is in operation, as well as provide an additional amount of lift for cycloidal rotor MAV 100. The rotational speed of the two cycloidal rotor assemblies 110 and tail rotor assembly 200, combined with the ability to vector the thrust of the cycloidal rotor assemblies 110, gives cycloidal rotor MAV 100, in the configuration shown in FIGS. 3-7, five control degrees of freedom, which results in cycloidal rotor MAV 100 having greater actuation potential than a typically under-actuated system such as a quad-rotor. This means that cycloidal rotor MAV 100 will be able to command instantaneous accelerations in more directions than a quad-rotor.

In the embodiment shown in FIGS. 3-7, airframe 102 of cycloidal rotor MAV 100 was developed using 3D printed parts and carbon fiber to integrate the cycloidal rotor assemblies 110, tail rotor assemblies 200, and electronics (e.g., autopilot 300, motors 402, power supply 404, servos 406, etc.) into a single unit, resulting in cycloidal rotor MAV 100 weighing approximately 29 grams in this embodiment. A weight breakdown of the subsystems of this embodiment of cycloidal rotor MAV 100 is provided in Table 1 below. The cycloidal rotor MAV 100 shown in FIGS. 3-7 comprises a twin meso-scale cyclocopter capable of both hovering and forward flight. As listed in Table 1, in the embodiment shown in FIGS. 3-7, power supply 404 comprises Li-Po batteries; however, in other embodiments, other power supplies, including batteries or other forms of power generation known in the art, may be used to power the components of cycloidal rotor MAV 100.

TABLE 1

| Component | Weight (g) | Total (%) |
| --- | --- | --- |
| Motors + transmission | 7 | 24 |
| Cyclorotors (combined) | 6 | 21 |
| Structure + wires | 5 | 18 |
| Li—Po Batteries | 4.9 | 17 |
| Electronics | 3.7 | 13 |
| Tail rotor + motor | 2.4 | 8 |
| Total | 29 | 100 |

Figure 5:
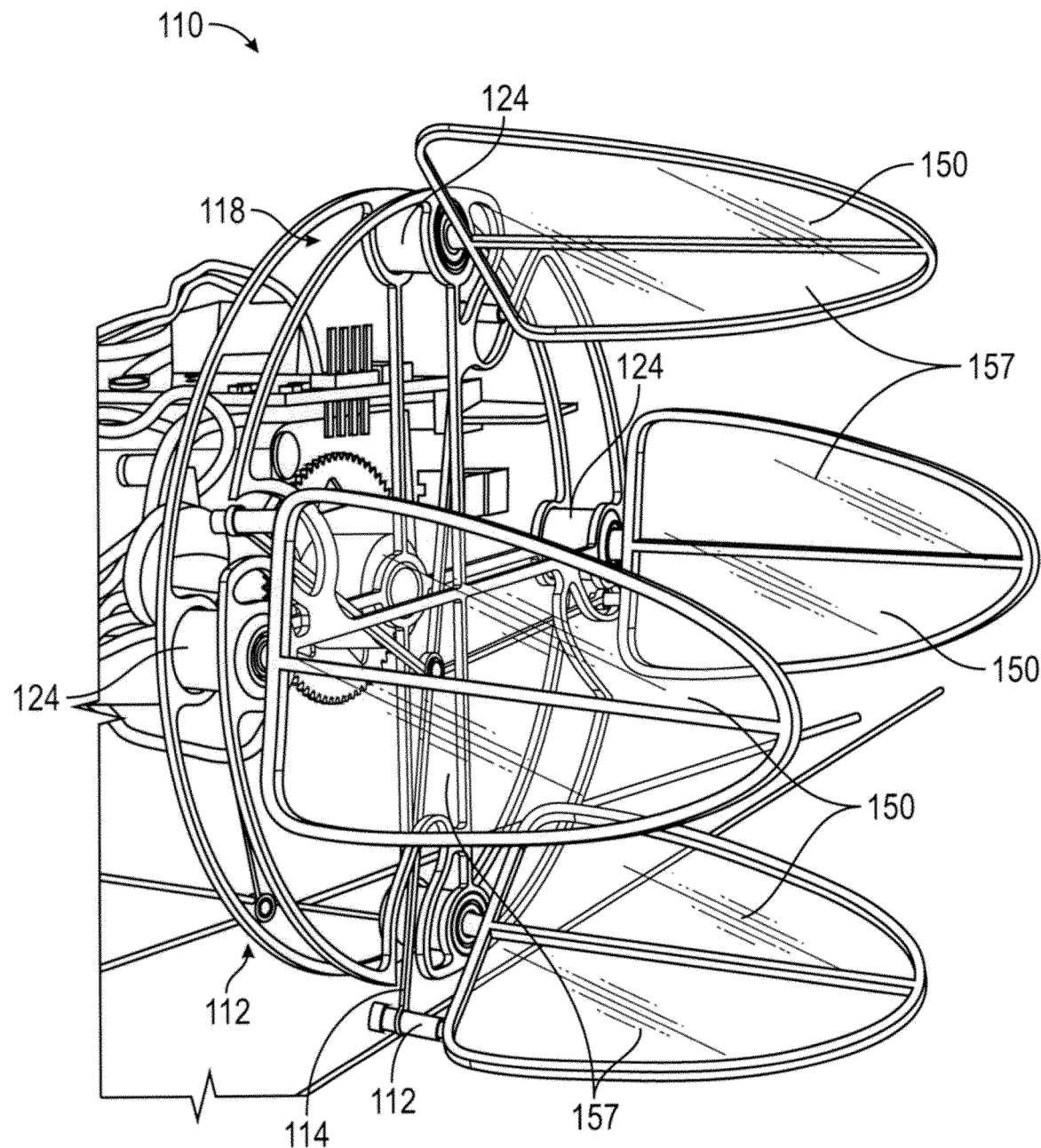
FIG. 5 is a perspective view of a cycloidal rotor assembly of the cycloidal rotor MAV of FIG. 3.
Figure 6:
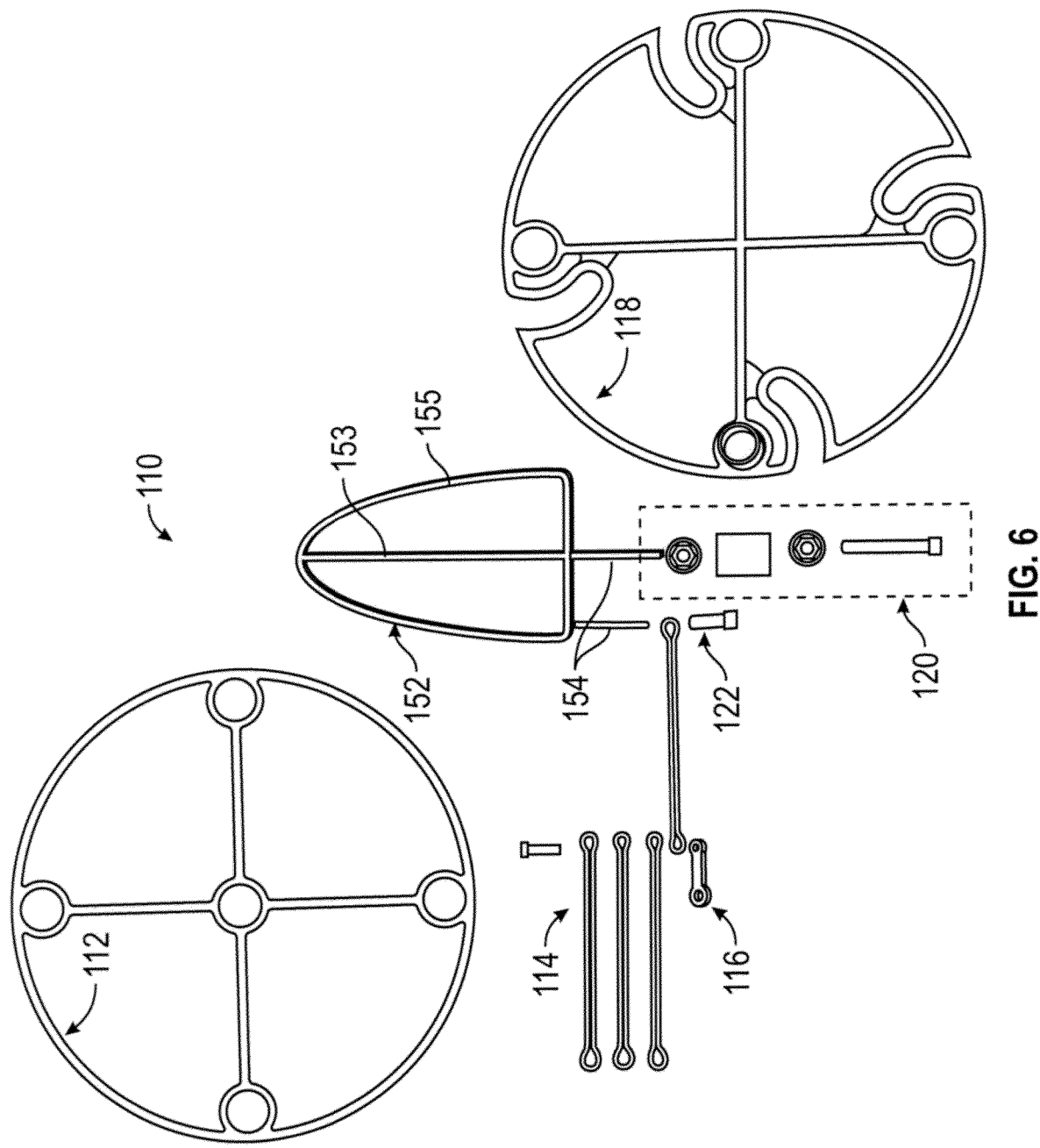
FIG. 6 is a front view of the cycloidal rotor assembly of FIG. 4 shown as disassembled.
Figure 7:
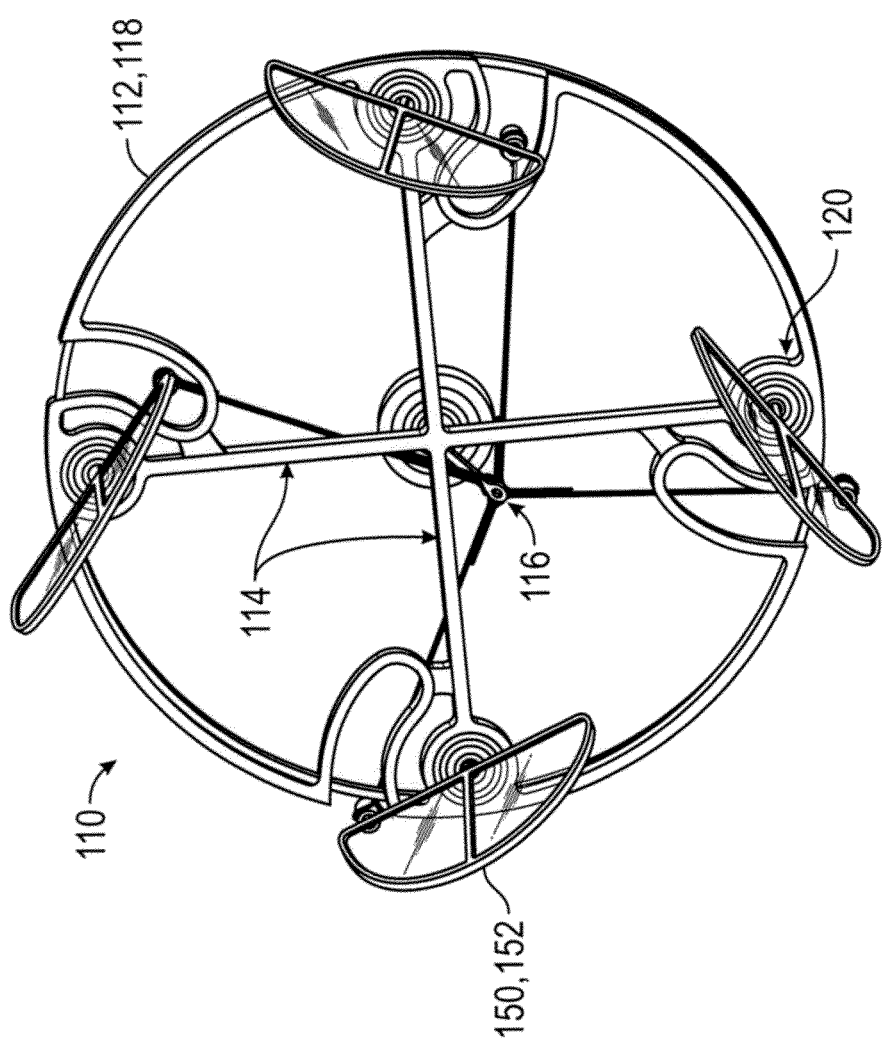
FIG. 7 is a front view of the cycloidal rotor assembly of FIG. 4.

As best shown in FIGS. 5-7, in this embodiment, each rotor assembly 110 of cycloidal rotor MAV 100 generally includes a rear frame 112, a plurality of pitch linkages 114, a pitch offset 116, a front frame 118, a bearing assembly 120 for each blade 150, a pitch link sleeve 122, and a spacer 124 (shown in FIG. 5) for each blade 150. In this embodiment, each bearing assembly 120 generally includes bearings, a Derlin® pillar spacer 124, and a Polyether ether ketone (PEEK) bushing. Additionally, as shown particularly in FIG. 6, each blade 150 includes a blade frame 152 including a stiff central main spar 153 and a semi-elliptical outer frame 155 made out of unidirectional pre-impregnated or prepreg carbon-fiber that is covered with a sheet of Mylar skin 157 (shown in FIG. 5). In this embodiment, each rotor assembly 110 uses cantilevered blades 150 with a semi-elliptical planform shape to reduce rotor weight (by eliminating the shaft and the additional tip end-plate) and improve aerodynamic efficiency (by reducing induced drag). The 1" radius of rotor assemblies 110 in this embodiment keeps the size and weight of the rotor low, as well as reduces the overall cross-sectional profile of cycloidal rotor MAV 100 and thus fits well within the size of cycloidal rotor MAV 100 in this embodiment. Because blades 150 in this embodiment are cantilevered, each rotor assembly 110 comprises a single end-plate-based rotor design, which is configured to resist flexing under the centrifugal loads experienced during high-speed rotation. The endplate of each rotor assembly 110 comprises the two separated carbon fiber frames 112 and 118, which are connected via spacers 124 made from Delrin® which also house the two root pitch bearings 120 for each blade 150. In this configuration, the endplates of rotor assemblies 110 are lightweight and have relatively high stiffness. In this embodiment, the carbon fiber frames 112 and 118 are made out of 1/32" thick laminate, but may be constructed in other ways known in the art. In this embodiment, given that deflection of the blades 150 at the root can reduce thrust produced therefrom, the carbon fiber frames 112 and 118 were made thicker at the attachment points to provide the necessary support.

In this embodiment, rotor assemblies 110 of cycloidal rotor MAV 100 each utilizes a passive blade pitching mechanism which is based on a 4-bar linkage system where the blade pitching is kinematically coupled to the rotation. In this embodiment, the pitch linkages 114 of rotor assemblies 110 are hinged to the pitch offset 116 beyond the end of the main rotor shaft in order to avoid interfering with the rotor shaft. For this cantilevered rotor design of cycloidal rotor MAV 100, blades 150 are mounted on the front carbon fiber frames 112 and 118, resulting in a root offset for each of the blades 150 from the end of the main rotor shaft by the Delrin® spacers 124. This allows the pitching linkages 114 to run in the space between the carbon fiber frames 112 and 118 directly from the end of the main rotor shaft to the blades 150. By strategically positioning the pitching links 114 between the frames 112 and 118 in this manner, they are protected during vehicle crashes.

As will be described in more detail below, in this embodiment, pitching links 114 are made of unidirectional carbon fiber prepreg. They are manufactured using a Teflon™ base mold and a silicone mat to compress the fibers into the mold, thus achieving the desired shape. The manufacturing process used in this embodiment, as will be discussed further herein with respect to blade design, allows the production of parts of consistent quality that may be too delicate to be fabricated with other methods. In this embodiment, the resulting linkages 114 weigh only approximately 0.01 grams each (weight may vary in other embodiments), and, since all of the carbon fibers are aligned in the direction of loading, they are relatively strong in that direction. The rest of the parts in the pitch mechanism, such as the bushings that interface between the blade frames 112 and 118 and blade bearings 120 and allow the blades 150 to freely pitch about the pitching axis, are milled from PEEK plastic for abrasion resistance in this embodiment. In this embodiment, the central pitch offset 116 is machined out of Delrin® and is glued onto the shaft with a strong, plastic-bonding cyano-acrylate adhesive. The pitch link sleeves 122 are fastened to the ends of the blade frames 112, 118, creating a hinge between the blades 150 and pitch links 114, which allows free and smooth rotation of the pitching mechanism. A pair of carbon fiber rods 154 (shown in FIG. 6) are attached to the root chord of each blade 150 and serve as the pitching axis and pitch link pegs. In this embodiment, the carbon fiber rods 154 have diameters of 0.7 mm. However, it should be appreciated that in general, the sizes, weights, materials, and method of manufacture described above for the components of each cycloidal rotor assembly 110 of cycloidal rotor MAV 100 may vary in other embodiments.

Referring now to FIGS. 3-12, an embodiment of a system 500 for molding or constructing blades 150 is shown in FIGS. 8-12. In the embodiment of FIGS. 3-12, the design of blades 150 of cycloidal rotor MAV 100 is biologically inspired, utilizing a symmetrically pitched, flat-plate airfoil. This design may offer advantages over other designs due to the low operating Reynolds number of approximately 11,000 (in this embodiment), and because constructing an airfoil at these scales may be too impractical to implement. The geometry of each blade 150 comprises a semi-elliptical planform configured for improving aerodynamic efficiency. In this embodiment, blades 150 of cycloidal rotor MAV 100 are manufactured via a layup technique or manufacturing process via system 500 using a Teflon™ (e.g., polytetrafluoroethylene (PTFE)) mold 502 and silicone compress or mat 504 configured for providing successful fabrication of stiff, light-weight blades 150. This is the same process used to manufacture the pitch linkages 114 described above, and is adapted to ensure that the unidirectional carbon fiber frame bond sufficiently and securely to the pitch axis and pitch link pegs. The Teflon™ material used in this process is configured to not bond with the carbon fiber when heat treated, is heat resistant, and is strong enough to maintain the mold shape under the clamping pressure used in the process. In this embodiment, cycloidal rotor MAV 100 has a total mass less than 200 grams; however, in other embodiments, the total mass of cycloidal rotor MAV 100 may vary.

Figure 8:
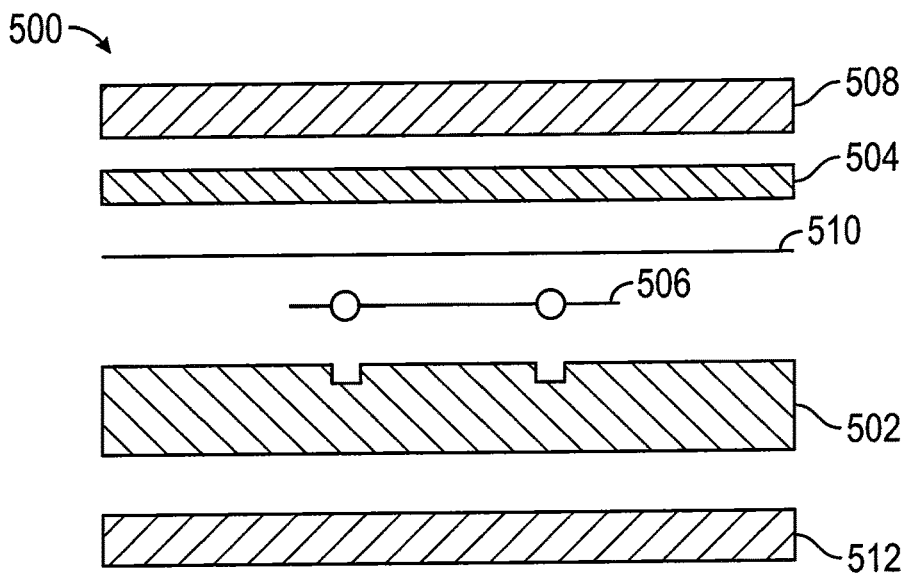
FIG. 8 is a schematic view of an embodiment of a system for molding blades of the cycloidal rotor MAV of FIG. 3.
Figure 9:
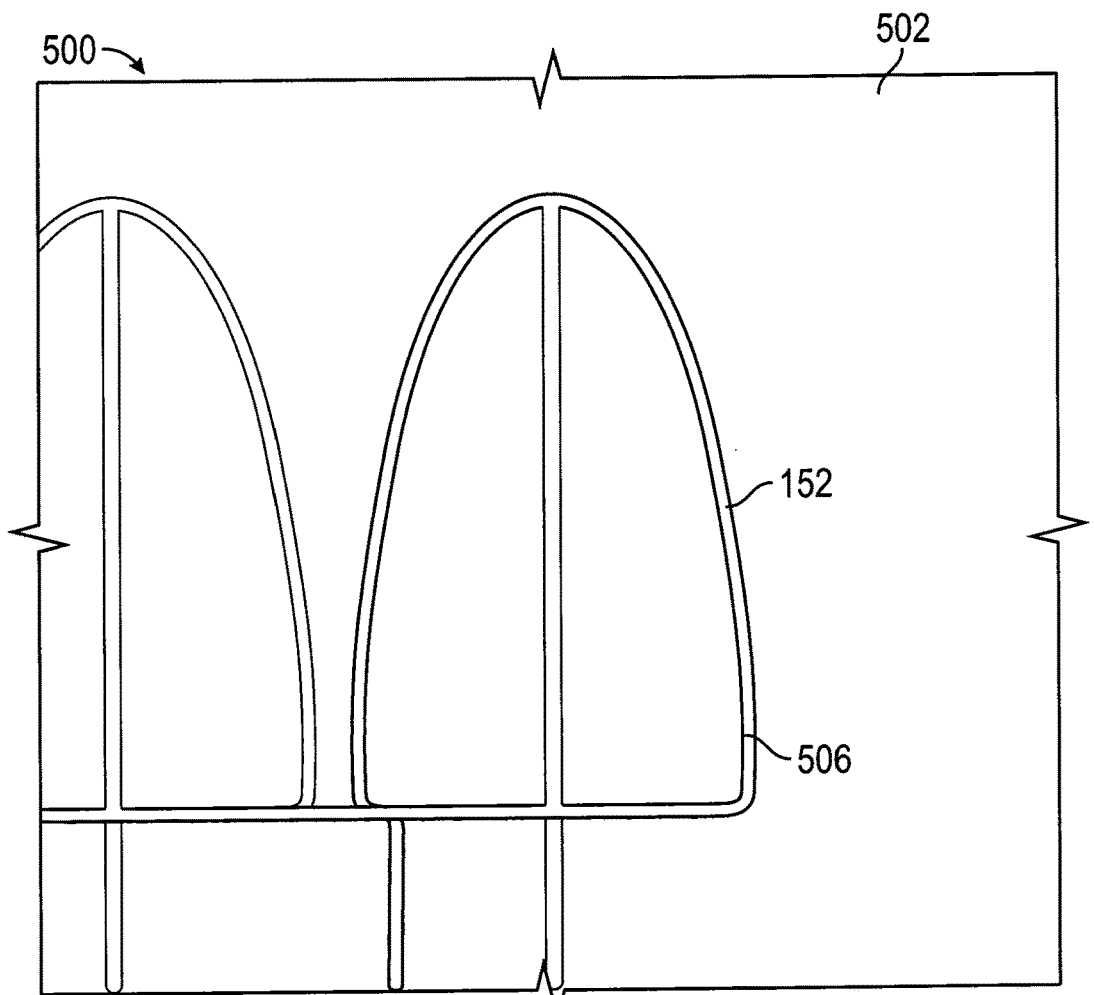
Figure 12:
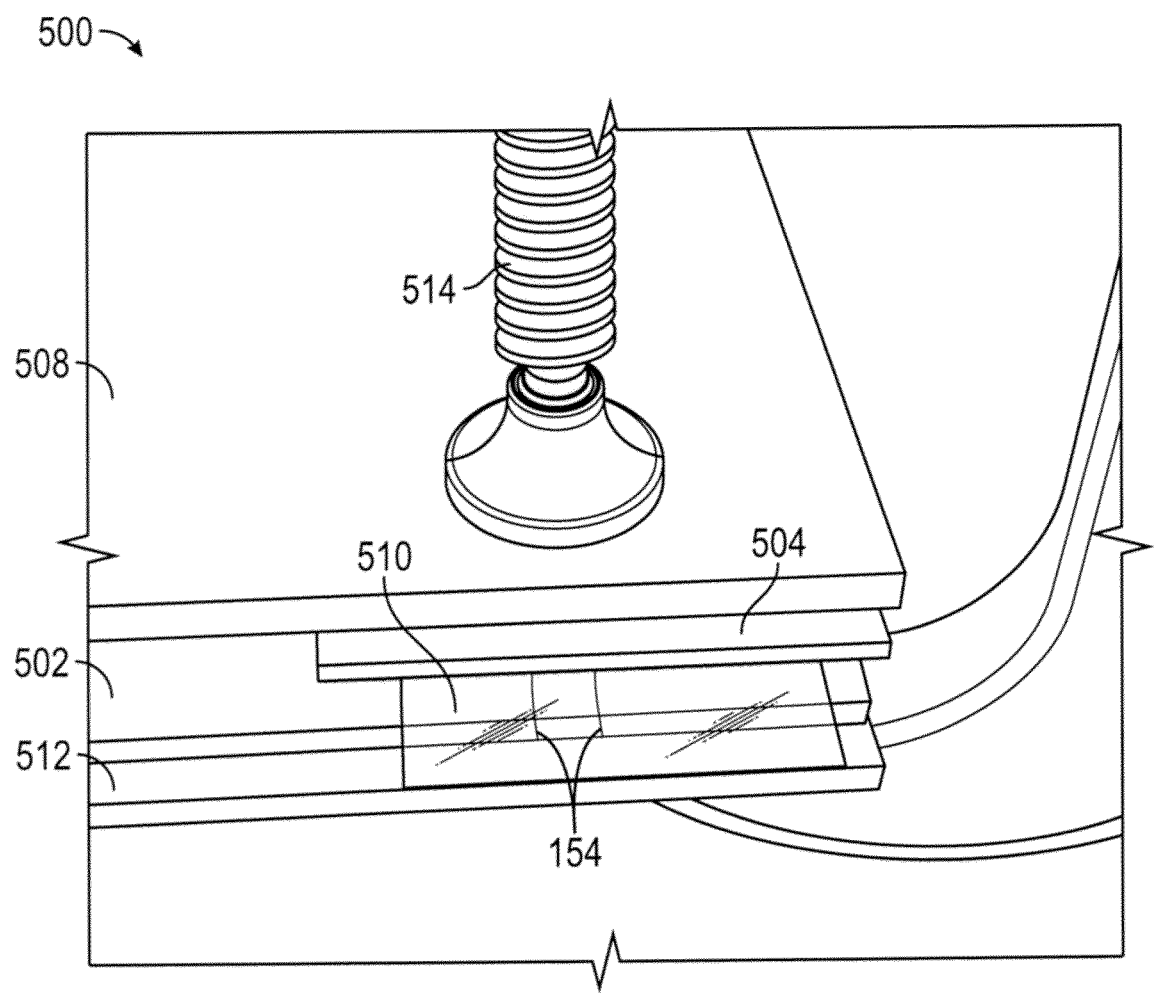
FIG. 12 is a perspective view of the molding system of FIG. 8.

As shown particularly in FIGS. 9-11, this embodiment of a process for manufacturing blades 150 of cycloidal rotor MAV 100 via system 500 includes a first step of laying a strip of unidirectional carbon fiber prepreg 506 into the Teflon™ mold 502 so that it makes a complete loop (shown in FIG. 9). Subsequently, carbon fiber rods 154 for the pitch axis and pitch link pegs are laid in their respective slots. The pitching axis of each of the blades 150 is positioned at the chordwise center of gravity in order to reduce the pitching moment on the blades 150 due to centrifugal loads (shown in FIG. 10). Following this step, another complete loop around the mold is made with the unidirectional strip so that the rods 154 are sandwiched between layers of the strip (shown in FIG. 11). This is then layered, as shown in FIG. 8, and clamped tightly together between an aluminum top plate 508, releasing film 510, and an aluminum bottom plate 512 of system 500. In this arrangement, the aluminum plates 508, 512 evenly apply the clamping pressure applied by a C-clamp 514 of system 500 (shown in FIG. 12). The flexible, heat-resistant silicone mat 504 transfers the pressure to the carbon fiber prepreg 506 and pushes it into the mold 502 without developing damaging pressure points. The anti-stick/releasing film 510 prevents the carbon fiber prepreg 506 from bonding with the silicone mat 504. When the full mold layup of system 500 is complete (shown in FIG. 12), it is cured at approximately 350° F. for around 135 minutes.

After the curing is finished and the cured epoxy and frame 152 of rotor 150 have cooled to room temperature, an approximately 3 micrometer thick Mylar sheet 157 is added to both sides of the now complete frame 152, effectively creating a closed surface within the frame shape. This is done by applying contact cement in a very thin layer to the frame 152 and the Mylar sheet 157 is stretched over the frame 152. A heating iron (not shown) may be used to remove any imperfections by stretching out the sheet of Mylar skin 157. In this embodiment, the resulting blades 150 weigh less than 0.2 grams, and have a maximum chord of about 0.8 inches and a span of around 1.3 inches. Although blades 150 of cycloidal rotor MAV 100 may be manufactured via the process of system 500 described above and illustrated in FIGS. 8-12, in other embodiments, blades 150 may be manufactured by differing systems and processes.

Figure 13:
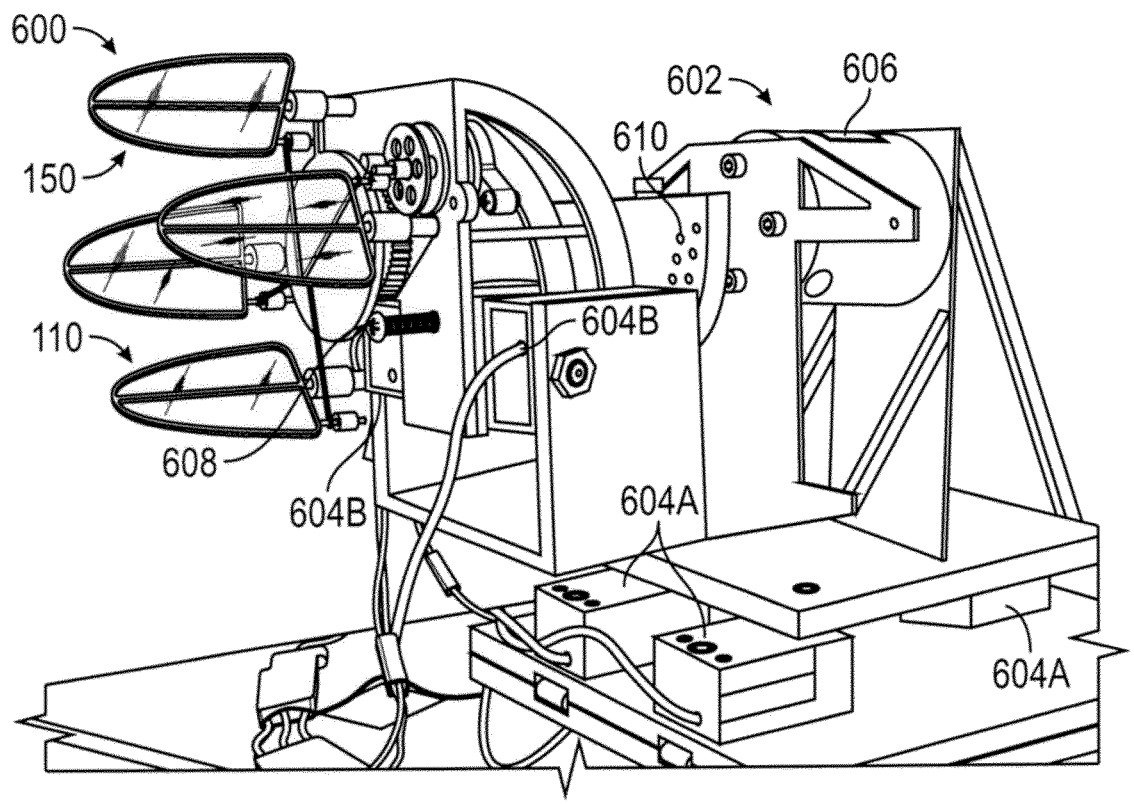
FIG. 13 is a perspective view of an embodiment of a testing system for a cycloidal rotor assembly in accordance with principles described herein.

Referring to FIGS. 4 and 13-24, as part of developing the rotor assemblies 110 used in the embodiment of cycloidal rotor MAV 100, a series of systematic experiments were conducted with a testing system 600 (shown in FIG. 13) to enhance and optimize the thrust and aerodynamic efficiency of the assemblies 110. In particular, the tests performed using testing system 600 were used to compare the performance of various rotor arrangements and configurations. In some tests, the pitch amplitude of the blades 150 during the rotation of the rotor was varied from ±35° to ±50° in increments of 5° for blades 150 of different size. In this manner, the size, pitch amplitude, and number of blades 150 that produced the highest thrust at a fixed rotational speed and the highest thrust/power ratio (or power loading) at the operating thrust could be identified and selected for the rotor assemblies 110 of cycloidal rotor MAV 100. To accurately measure rotor performance (vertical force, sideways force, and power), testing system 600 included a three-component force balance 602 (shown in FIG. 13) that was systematically calibrated to ensure accurate results. This new miniature three-component force balance 602 measured the small forces produced by the 3 gram cycloidal rotor assemblies 110 of cycloidal rotor MAV 100. As shown particularly in FIG. 13, the balance 602 of testing system 600 included a $T_Z$ force load cell 604A and a $T_Y$ force load cell 604B that measured the two orthogonal components of thrust ($T_Z$ and $T_Y$, respectively), and a reaction torque sensor 606 that measured the torque generated by the cycloidal rotor assembly 110. In addition, testing system 600 included a Hall-effect switch 608 that measured the rotational speed in revolutions per minute (RPM) of the cycloidal rotor 110 in real time. Mechanical power was calculated from the torque and rotational speed measurements. In this embodiment, testing system 600 also provided phase adjustment 610.

Figure 14:
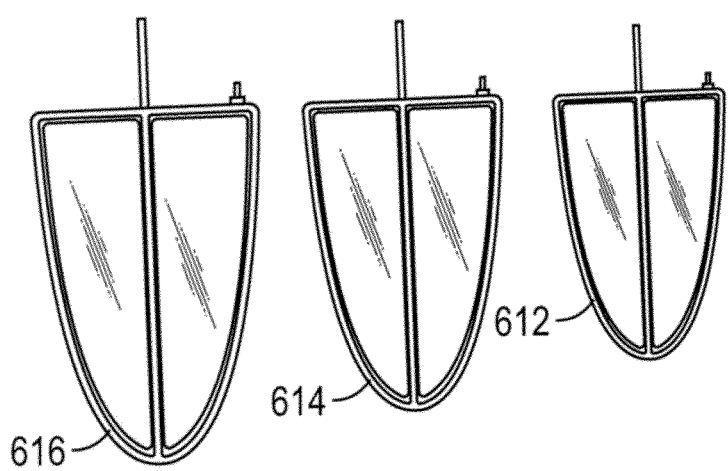
FIG. 14 is a front view of a plurality of test blades of the testing system of FIG. 13.
Figure 15:
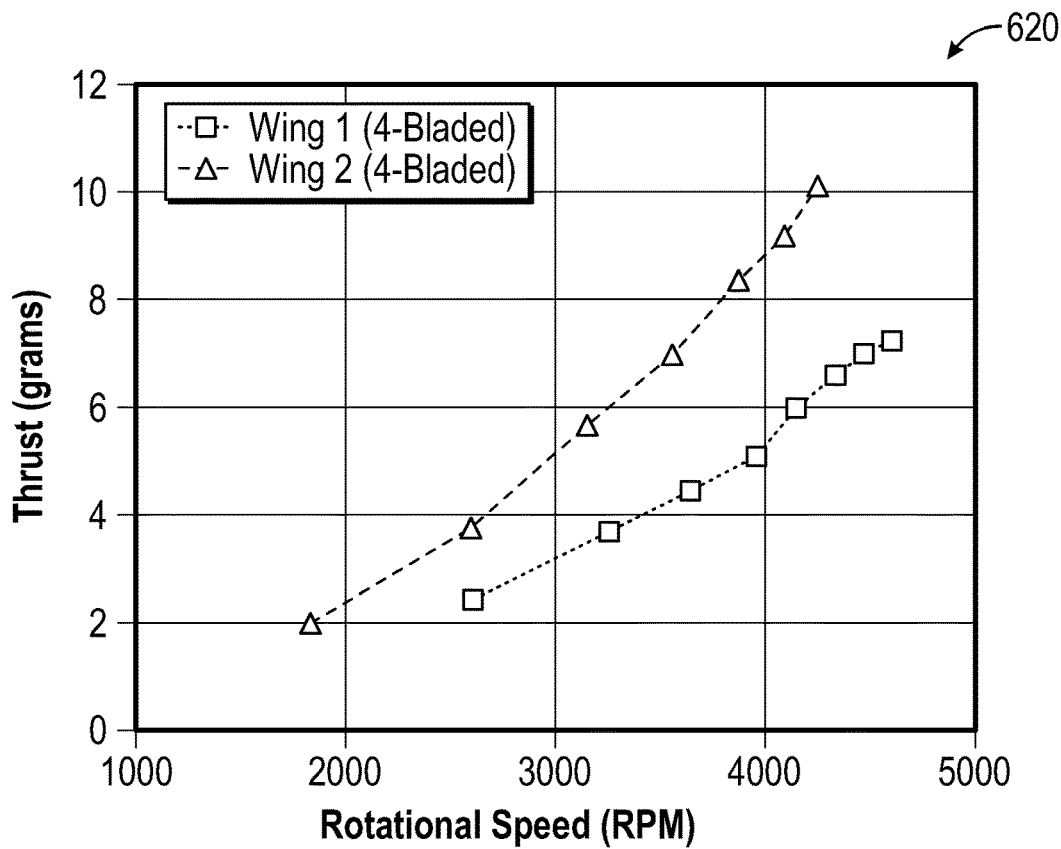
FIG. 15 is a graph illustrating thrust versus rotational speed at varying blade lengths for a four-bladed cycloidal rotor assembly of the testing system of FIG. 13.

The results from the experimental parametric studies using the three-component balance are shown in FIGS. 15-24. The testing process employed using testing system 600 included a first step of analyzing the effect of blade size on rotor performance; particularly, which blade size provided the maximum thrust for the lowest weight penalty. As best shown in FIG. 14, to this end, a set of three blades 150 with identical planform, but scaled to different sizes, was built and tested: a Wing 1 or first wing 612 weighing approximately 0.22 grams (g), a Wing 2 or second wing 614 weighing approximately 0.14 g, and a Wing 3 or third wing 616 weighing approximately 0.12 g. Testing results suggested third wing 616 was too heavy and therefore unable to withstand the inertial loads and it suffered from large deflections at the required RPM, so only limited data was collected at low rotational speeds. The first wing 612, on the other hand, although light enough to rotate at 4000 RPM, may be too small to likely generate sufficient thrust. The second wing 614, however, was able to produce the desired thrust at the targeted RPM, and was subsequently chosen for use in the cycloidal rotor assemblies 110 of cycloidal rotor MAV 100 shown in FIGS. 3-7. The graph 620 of FIG. 15 illustrates the variation in thrust with rotational speed for the first wing 612 and the second wing 614, demonstrating that the larger wing can produce the required thrust at a reasonable rotational speed.

Figure 16:
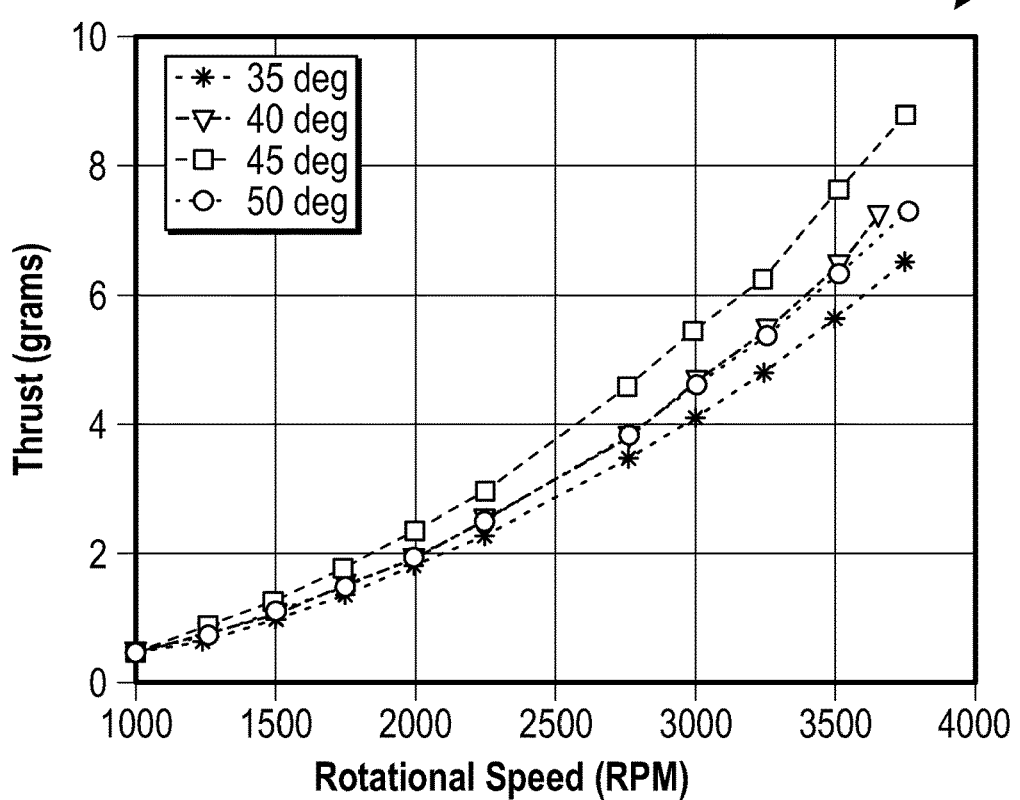
FIG. 16 is a graph illustrating thrust versus rotational speed at varying blade pitch amplitudes for a four-bladed cycloidal rotor assembly of the testing system of FIG. 13.
Figure 17:
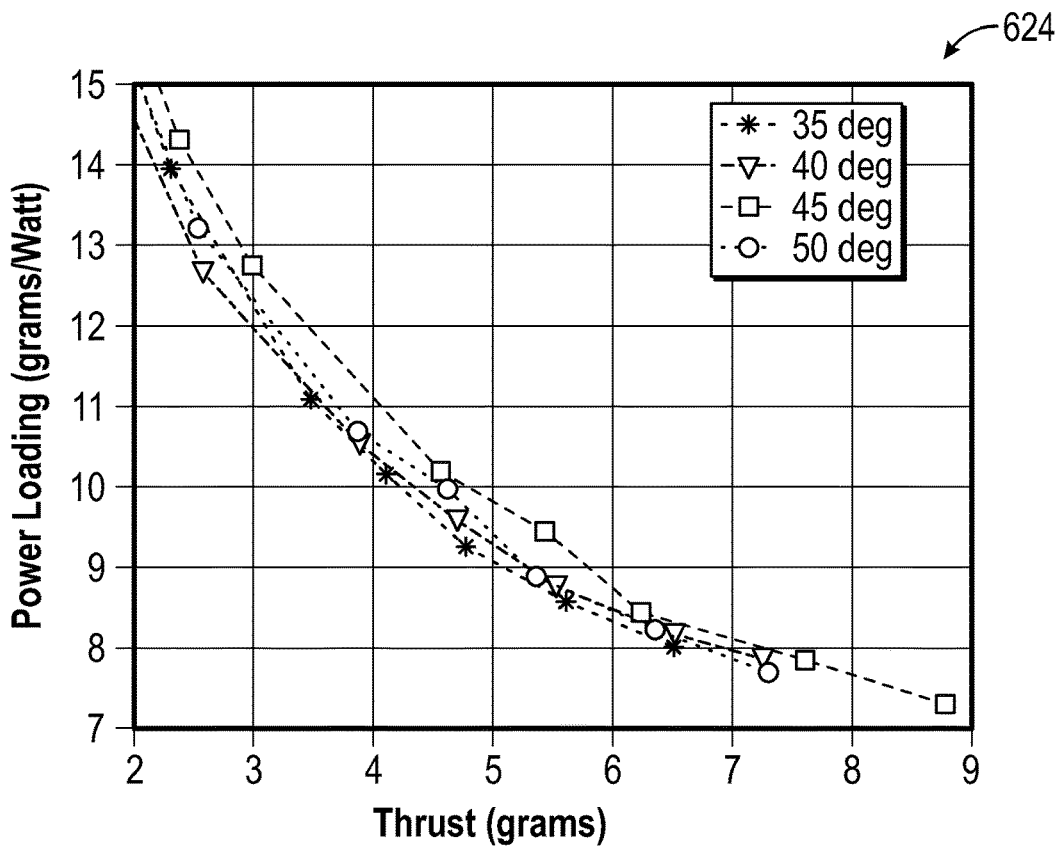
FIG. 17 is a graph illustrating power loading versus rotational speed at varying blade pitch amplitudes for a four-bladed cycloidal rotor assembly of the testing system of FIG. 13.

The remaining studies described herein were conducted using the second wing 614 while changing other parameters of the cycloidal rotor assembly. In particular, the next tests were conducted to analyze the effects of maximum blade pitch amplitude. Graph 622 of FIG. 16 illustrates the variation in thrust with rotational speed for the 4-bladed pitch amplitude sweep of 35° to 50°. Graph 622 indicated that 45° maximum pitch amplitude generated the highest thrust for the 4-bladed rotor assembly 110. The thrust to power ratio (or power loading) is shown in the graph 624 of FIG. 17, which is a quantitative metric describing the aerodynamic efficiency of the rotor assembly 110. Again, the test results suggested the 45° pitch amplitude provided superior performance relative to the other pitch amplitudes.

Figure 18:
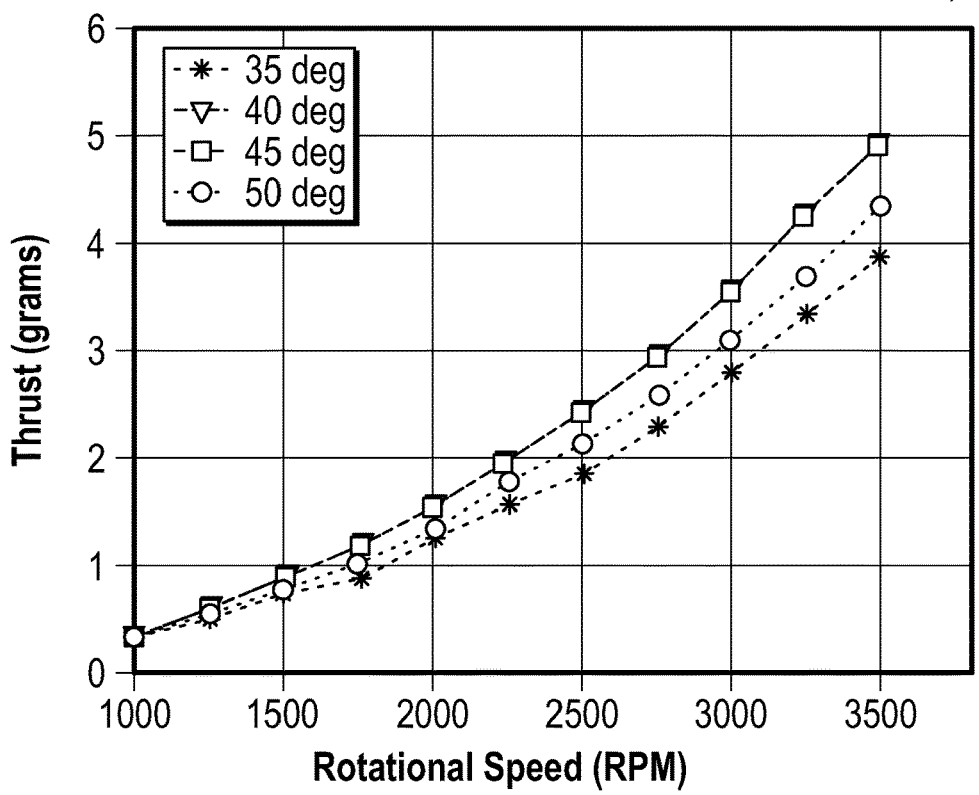
FIG. 18 is a graph illustrating thrust versus rotational speed at varying blade pitch amplitudes for a two-bladed cycloidal rotor assembly of the testing system of FIG. 13.
Figure 19:
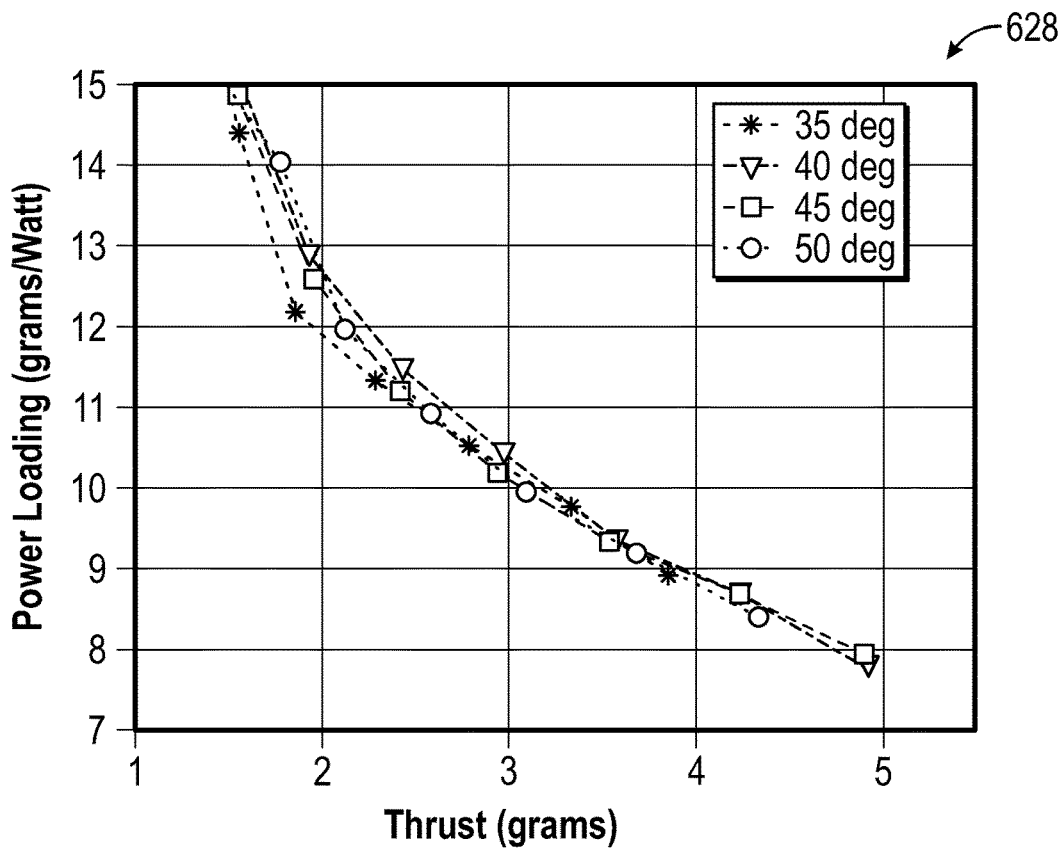
FIG. 19 is a graph illustrating power loading versus rotational speed at varying blade pitch amplitudes for a two-bladed cycloidal rotor assembly of the testing system of FIG. 13.
Figure 20:
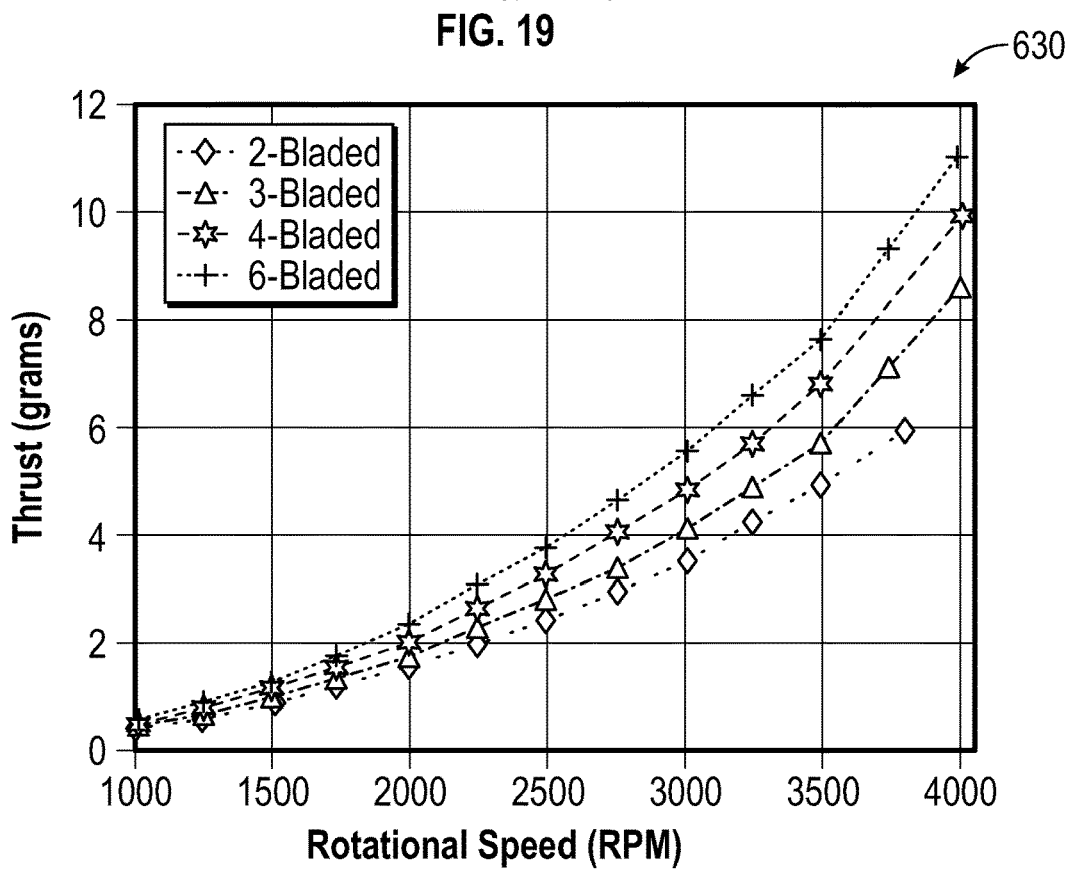
FIG. 20 is a graph illustrating thrust versus rotational speed at 45° pitch for two, three, four, and six-bladed cycloidal rotor assemblies of the testing system of FIG. 13.
Figure 21:
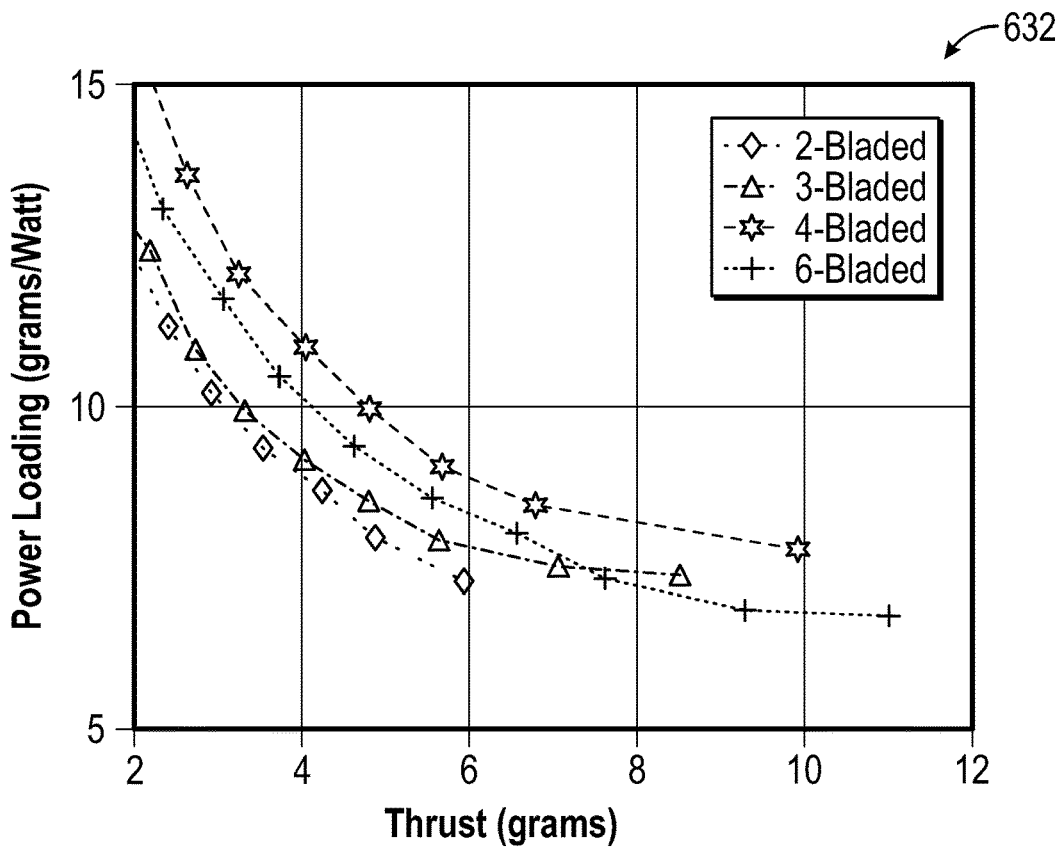
FIG. 21 is a graph illustrating power loading versus rotational speed at 45° pitch for two, three, four, and six-bladed cycloidal rotor assemblies of the testing system of FIG. 13.

This same pitch sweep was repeated for the 2-bladed case (e.g., a rotor assembly comprising two blades 150) and the results are shown in the graphs 626, 628 of FIGS. 18 and 19, respectively. Particularly, the results of the test suggested that, for the 2-bladed rotor, the maximum thrust (shown in graph 626 of FIG. 18) and power loading (shown in graph 628 of FIG. 19) was produced between 40° and 45° pitch amplitude. Based on these results, 45° was selected as the pitch angle and, in subsequent tests, the number of blades 150 of the cycloidal rotor assembly 110 was varied. Specifically, the next step was to understand the effect of the number of blades 150 on performance. FIGS. 20 and 21 illustrate graph 630, 632, respectively, of thrust and power loading, respectively, for 2, 3, 4, and 6-bladed rotor assemblies at 45° pitch amplitudes. The data presented in the graphs 630, 632 FIGS. 20 and 21, respectively, indicated that the 6-bladed rotor assembly produced more thrust relative to the 2, 3, and 4-bladed rotor assemblies. However, the extra blades of the 6-bladed rotor assembly add weight to the rotor assembly and as seen from graph 632 of FIG. 21, the 4-bladed rotor assembly was more efficient for an equivalent level of thrust relative to the 6-bladed rotor assembly. Therefore, the cycloidal rotor assemblies 110 of cycloidal rotor MAV 100 shown in FIGS. 3-7 are 4-bladed with a pitch amplitude of 45°.

The testing performed via testing system 600 indicated a 4-bladed rotor assembly at the 45° pitch amplitude provided higher performance than the 40° pitch amplitude case; however, on a 2-bladed rotor assembly both 45° and 40° pitch amplitudes offered comparable performance. This may be because the pitch amplitude alone does not fully reflect the aerodynamic conditions experienced by the blade. Particularly, it may be important to bring in the inflow through the rotor assembly in each of the cases. Inflow velocity is proportional to the square root of thrust for a constant rotor area and it reduces the effective angle of attack seen by the blades 150. Given that the 4-bladed rotor assembly configuration has a relatively higher inflow than a 2-bladed rotor assembly (due to higher thrust) at the same rotational speed, the effective angle of attack seen by the blade on a 4-bladed rotor assembly is generally lower than the 2-bladed rotor assembly. In other words, the 45°, 4-bladed rotor assembly may have an approximately equivalent angle of attack as the 40°, 2-bladed rotor assembly. This may also be the reason why the 4-bladed rotor assembly does not produce twice the thrust of the 2-bladed at the same rotational speed. Based on these results, a blade pitch amplitude of 45° and a 4-bladed rotor assembly configuration are utilized in the cycloidal rotor assemblies 110 of cycloidal rotor MAV 100 shown in FIGS. 3-7.

Figure 22:
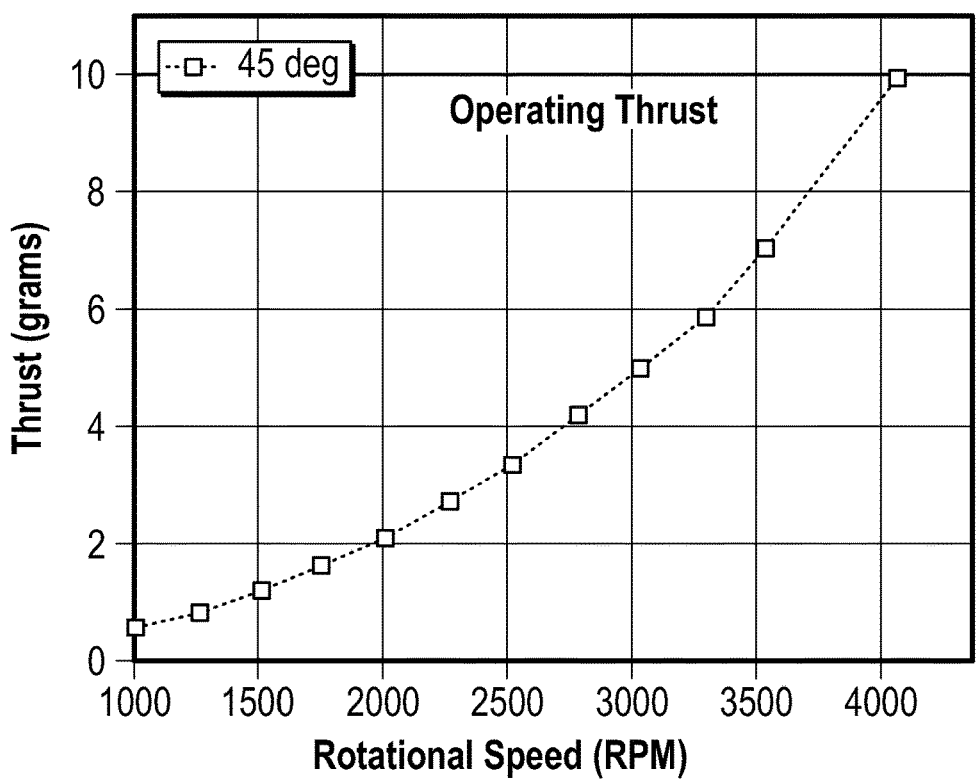
FIG. 22 is a graph illustrating thrust versus rotational speed for a four-bladed cycloidal rotor assembly of the testing system of FIG. 13.
Figure 23:
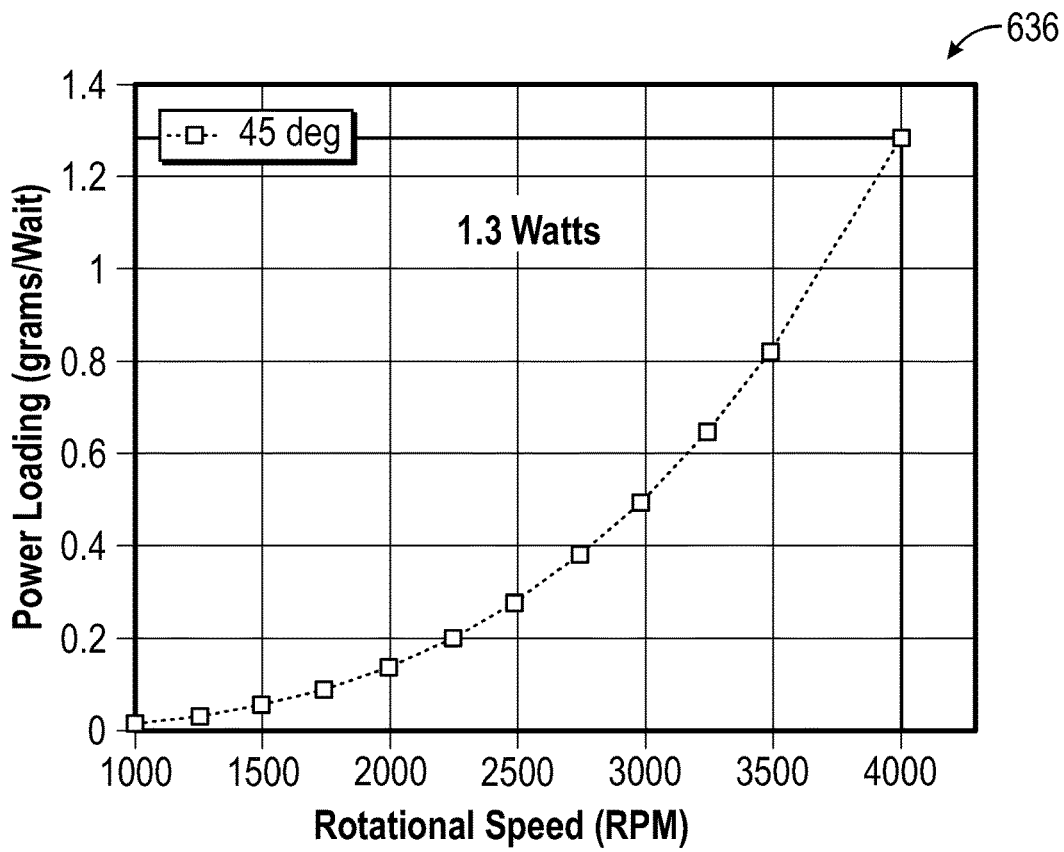
FIG. 23 is a graph illustrating power loading versus rotational speed for a four-bladed cycloidal rotor assembly of the testing system of FIG. 13.
Figure 24:
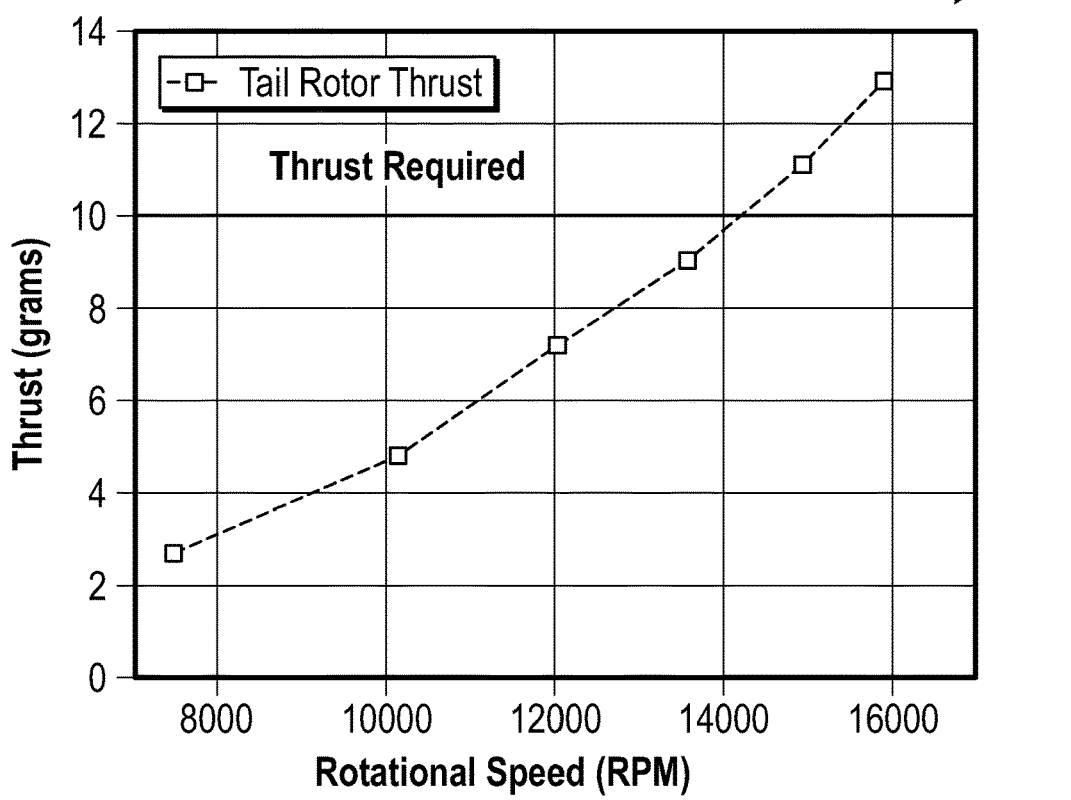
FIG. 24 is a graph illustrating power loading versus rotational speed of a tail rotor assembly of the testing system of FIG. 13.
Figure 25:
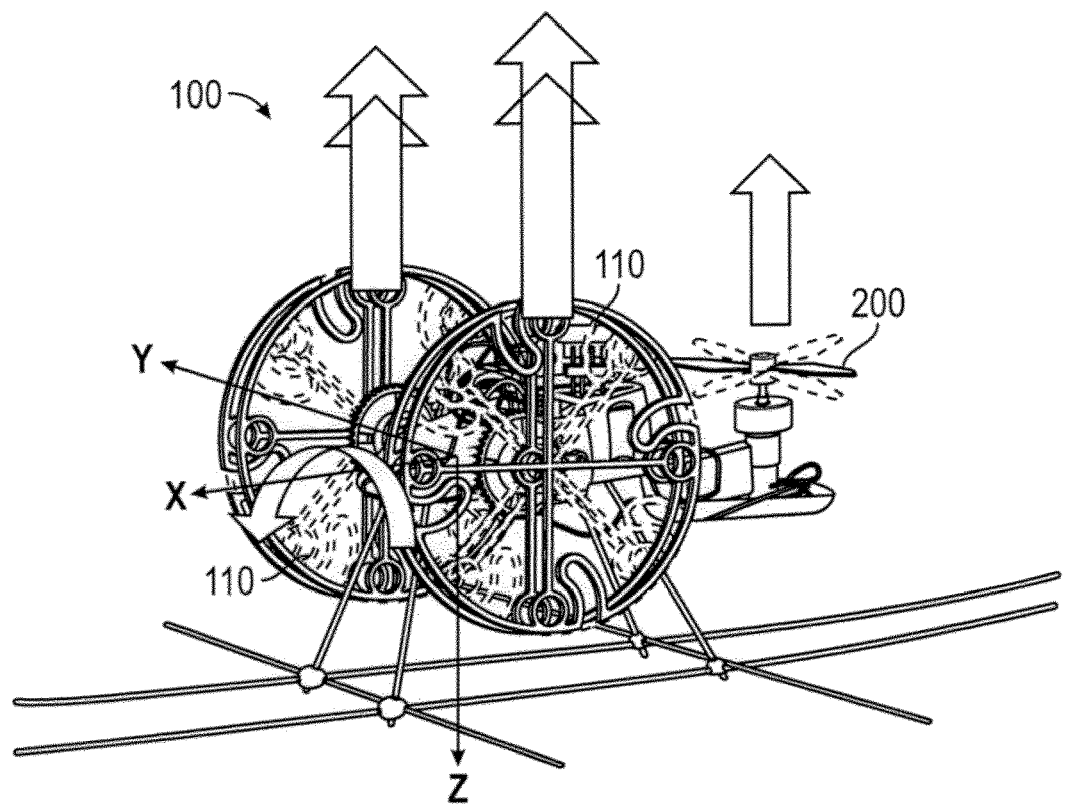
FIG. 25 is a perspective view of the cycloidal rotor MAV of FIG. 3 illustrating positive roll control during operation.
Figure 26:
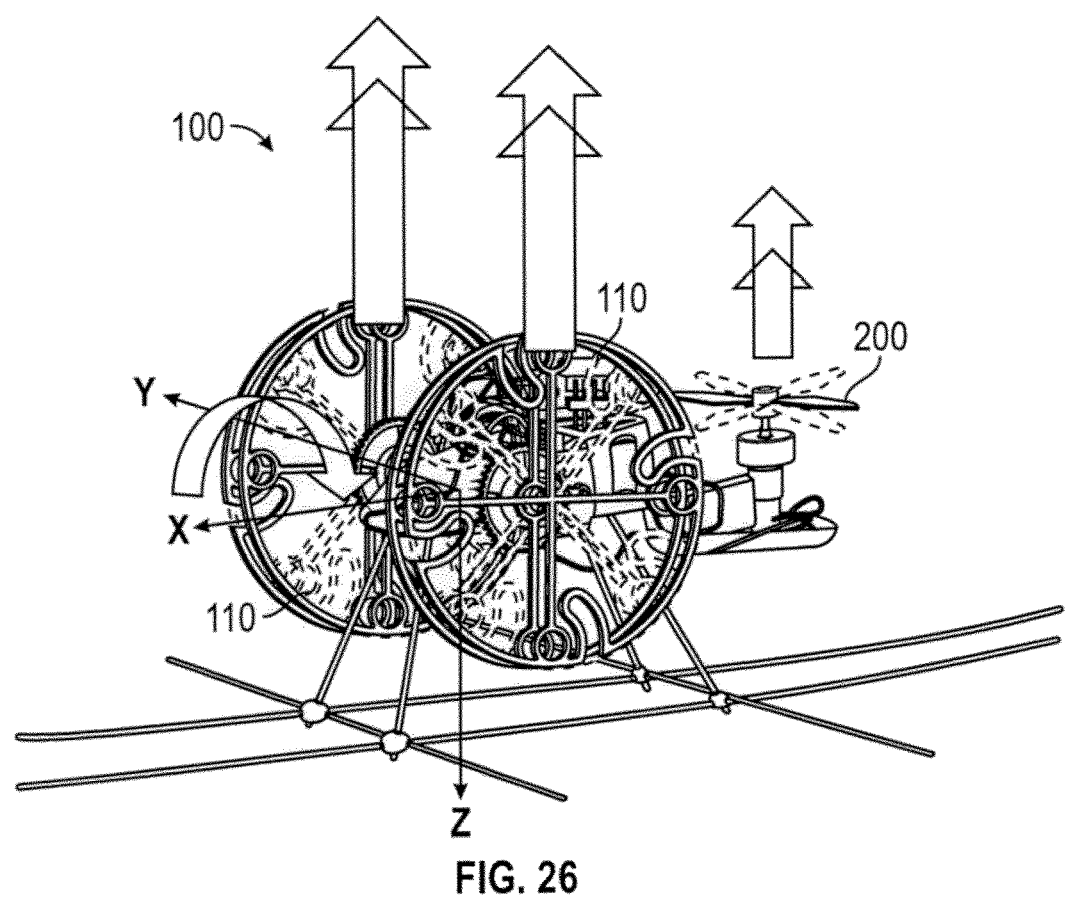
FIG. 26 is a perspective view of the cycloidal rotor MAV of FIG. 3 illustrating positive pitch control during operation.
Figure 27:
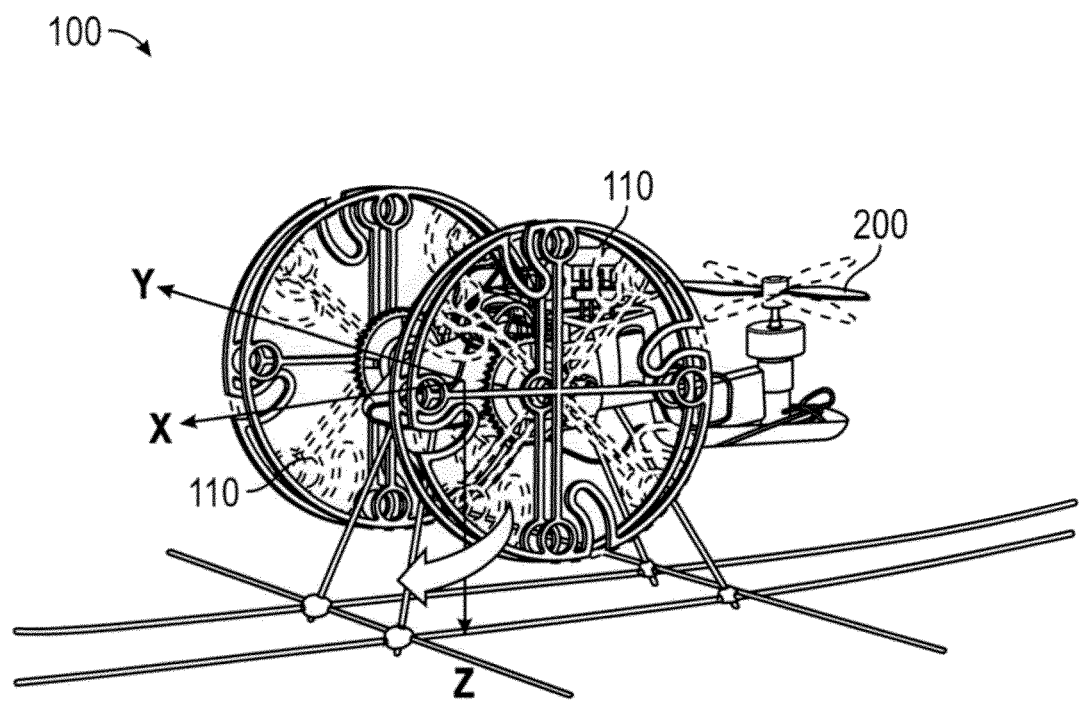
FIG. 27 is a perspective view of the cycloidal rotor MAV of FIG. 3 illustrating positive yaw control during operation.

In the manner described, the embodiment of the cycloidal rotor assembly 100 described above offers the potential to outperform the other rotor assembly configurations tested herein, and appears to produce sufficient thrust (approximately 10 grams) at the target operating RPM of about 4000, expending approximately 1.28 watts of mechanical power, as shown in graph 634 of FIG. 22 and graph 636 of FIG. 23. Because the remaining thrust will be produced by tail rotor assembly 200, a lightweight propeller was selected and also tested over a range of rotational speeds using the motor 202 of cycloidal rotor MAV 100 using testing system 600. Thrust from tail rotor assembly 200 sufficient to counteract the torque of the main rotors was around 8-10 grams. A plot of the test data for the tail rotor assembly 200 is presented in the graph 638 of FIG. 24, which indicated that the selected rotor-motor combination was capable of producing thrust sufficient for the operation of cycloidal rotor MAV 100.

Following the testing with testing system 600 and subsequent selection of the blade size, geometry and number of blades 150 for the embodiment of cycloidal rotor MAV 100 shown in FIGS. 3-7, a further analysis was conducted on the blades 150 and rotor assembly setup to evaluate blade deflection of the cycloidal rotor assemblies 110, either from a weak root boundary condition or bending along the span of the blades 150. The method used to qualitatively evaluate blade deflection was a series of experiments conducted using a testing system or apparatus including a strobe light, which was flashed in synchronization with the rotational frequency of the cycloidal rotor assembly 110. This gives the appearance that the cycloidal rotor assembly 110 is stopped, and the amount of deflection experienced by the cycloidal rotor assembly 110 was qualitatively compared with that of the non-rotating assembly 110. When comparing the image produced by the strobe light with that of FIG. 5, for instance, there was only minimal deflection at the operating frequency of 4000 RPM. Therefore, based upon these results, it was suggested that, on the design of cycloidal rotor assembly 110 of cycloidal rotor MAV 100 shown in FIGS. 3-7, bending deflections do not substantially reduce the efficiency of cycloidal rotor assemblies 110.

Figure 4:
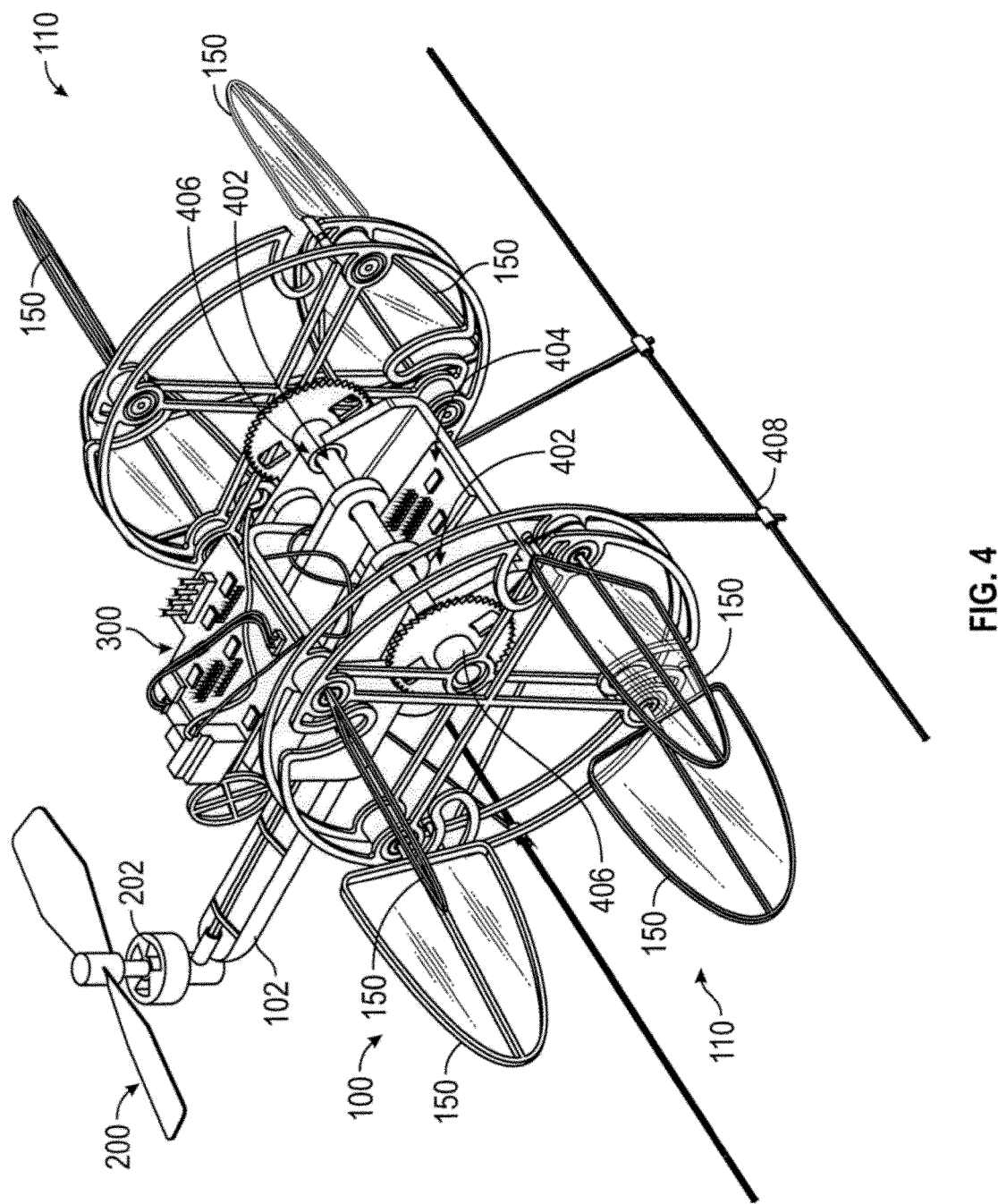
FIG. 4 is a perspective view of a prototype of the cycloidal rotor MAV of FIG. 3.

Using the cycloidal rotor assembles 110 in the configuration shown in FIG. 4, a flight-ready embodiment of cycloidal rotor MAV 100 was constructed. As part of this procedure, each component on cycloidal rotor MAV 100 was selected or manufactured to be as light as possible without compromising the integrity of cycloidal rotor MAV 100. The airframe 102, which functions as an anchor point for all electrical and mechanical subsystems of cycloidal rotor MAV 100, was designed to hold the components in a compact configuration, thus, minimizing the profile of cycloidal rotor MAV 100. Airframe 102 was rapid prototyped from ABS plastic and features carbon fiber rods extending outwards that function as landing gear 408.

In embodiments described herein, the thrust vectoring of each of the cycloidal rotor assemblies 110 of cycloidal rotor MAV 100 is actuated by means of a servo 404 actuator weighing approximately 1 gram. In this embodiment, the cycloidal rotor assemblies 110 of cycloidal rotor MAV 100 are each driven by a 2.5 gram brushless, out-runner motor 402. In this embodiment, both the motors 402 and actuator servos 404 are powered by the power supply 406, which comprises a 240 mah single cell Li-Po battery weighing approximately 3.7 grams. In this configuration, the total weight of the cycloidal rotor MAV 100 shown in FIG. 4 is approximately 29 grams. In other embodiments, cycloidal rotor MAV 100 and its associated components described above may be formed from varying materials constructed via differing manufacturing processes, and may have varying properties with respect to size, shape, and composition.

Referring to FIGS. 4 and 25-30, control of cycloidal rotor MAV 100 may be accomplished in varying ways, including: varying the RPM of the drive motors 402, 202 for either the main cycloidal rotor assemblies 110 or the tail rotor assembly 200 (changes thrust magnitude), respectively, and/or rotating the offset link 116 in the pitching mechanisms of rotor assemblies 110, which changes the blade pitch phasing (thrust vectoring) of the blades 150 of rotor assemblies 110. Modulating the cycloidal rotor assembly 110 RPMs and the angle of the pitch offset 116 provides complete control over rolling, pitching and yawing motion of cycloidal rotor MAV 100. Because of this ability to instantaneously change the magnitude and direction of the thrust vectors from the cycloidal rotor assemblies 110, superior levels of agility and maneuverability may be achieved over traditional rotorcraft. The specifics of the control strategy implemented for attitude control are demonstrated in FIGS. 25-27. For roll control, the RPM of each of the main cycloidal rotor assemblies 110 may be changed differentially to increase the thrust of one cycloidal rotor assembly 110 while decreasing that of the other cycloidal rotor assembly 110, effectively creating a moment about the longitudinal axis of cycloidal rotor MAV 100 (shown in FIG. 25). To control pitch, the RPM of the tail rotor assembly 200 may be varied to either increase or decrease the thrust created therefrom and generate a moment about the lateral axis due to the offset of the tail rotor assembly 200 from the center of gravity (CG) (shown in FIG. 26). Further, yawing moments may be generated by rotating the pitch offset links 116 of each cycloidal rotor assembly 110 in unison which tilts the thrust vectors of the main cycloidal rotor assemblies 110 in opposite directions, effectively creating a moment about the vertical axis of cycloidal rotor MAV 100 (shown in FIG. 27).

Additionally, another consideration of cyclocopter flight is the gyroscopic coupling present between roll and yaw degrees of freedom when either a roll or yaw control input is given. Because, in this embodiment, both main cycloidal rotor assemblies 110 are rotating in the same direction (clockwise when viewed from the starboard side of cycloidal rotor MAV 100) about the lateral axis, any moment which causes rotation of cycloidal rotor MAV 100 about either the longitudinal or vertical axis will result in a gyroscopic moment 90° out of phase. Thus, if cycloidal rotor MAV 100 is rolled, for example, to the right, a positive yawing motion (clockwise when viewed from above) will be introduced. To compensate for this coupled behavior between roll and yaw, the embodiment of cycloidal rotor MAV 100 shown in FIG. 4 includes autopilot 300, which is generally configured to automatically provide input commands to yaw when roll is activated, and vice versa. Feedback gains are handled similarly and provide coupled commands between both degrees of freedom.

Figure 29:
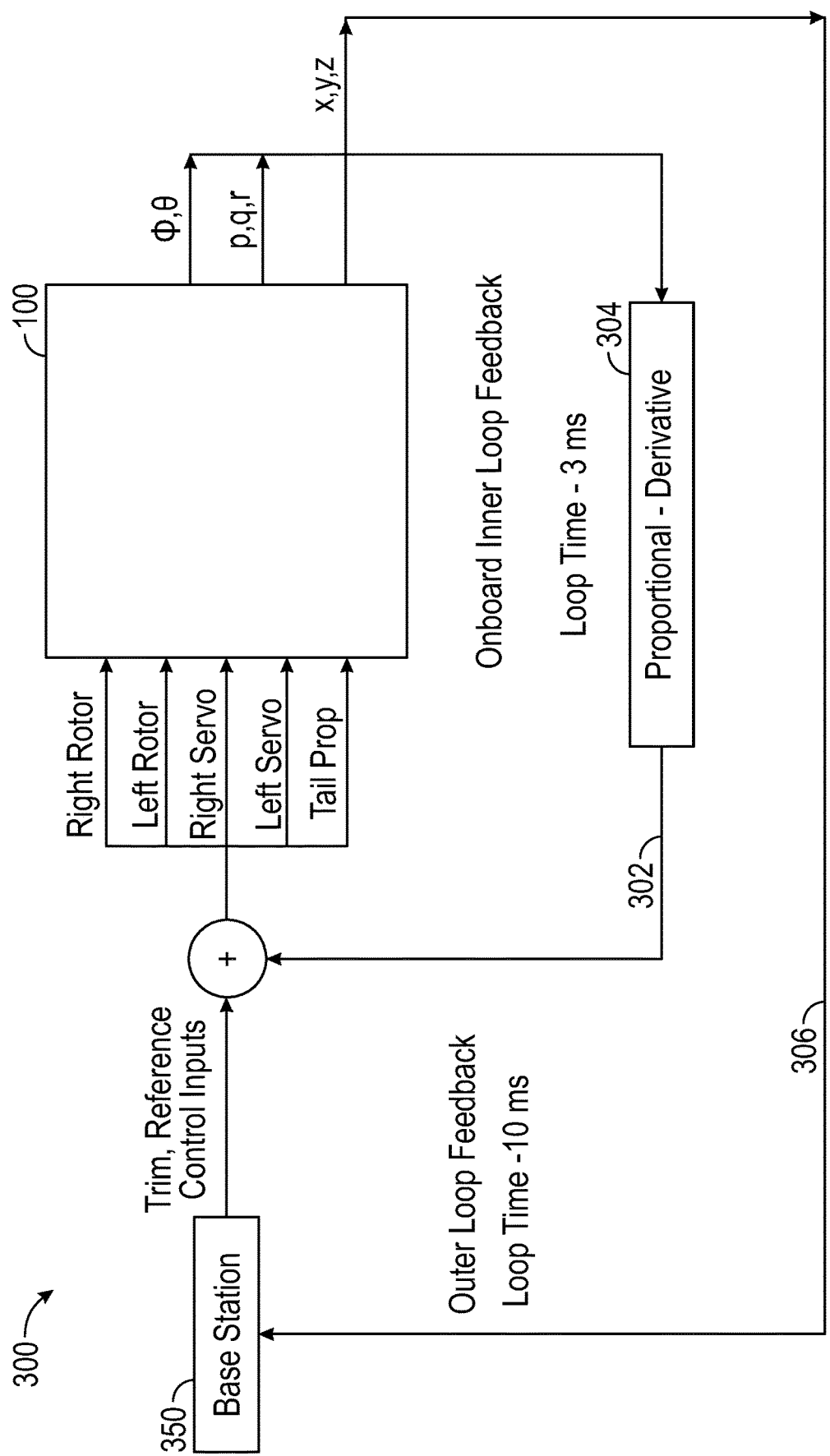
FIG. 29 is a schematic view of an embodiment of a control system for the cycloidal rotor MAV of FIG. 3 in accordance with the principles disclosed herein.
Figure 30A:
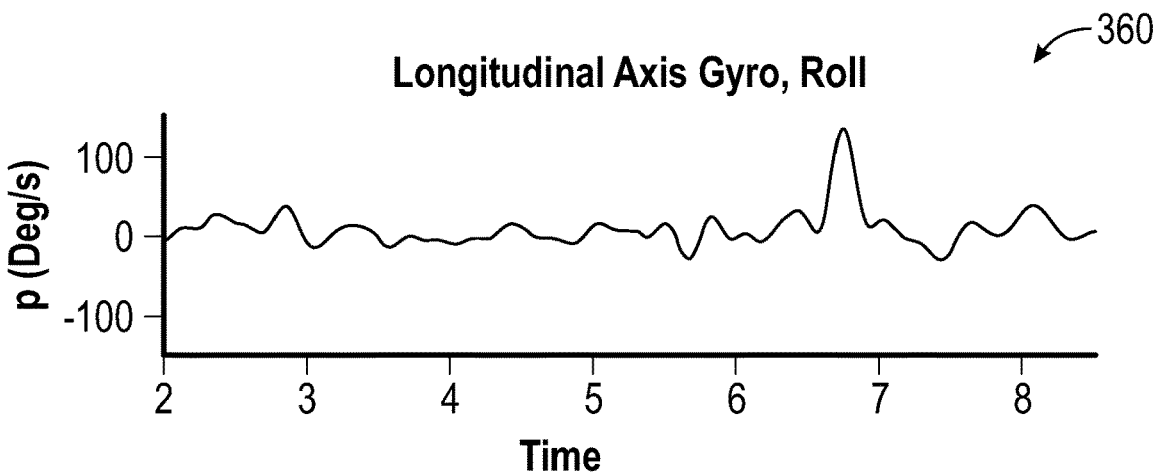
FIGS. 30$a$-30$c$ are graphs illustrating angular rates of roll, pitch, and yaw, respectively, of the cycloidal rotor MAV of FIG. 3 during hovering flight.
Figure 30B:
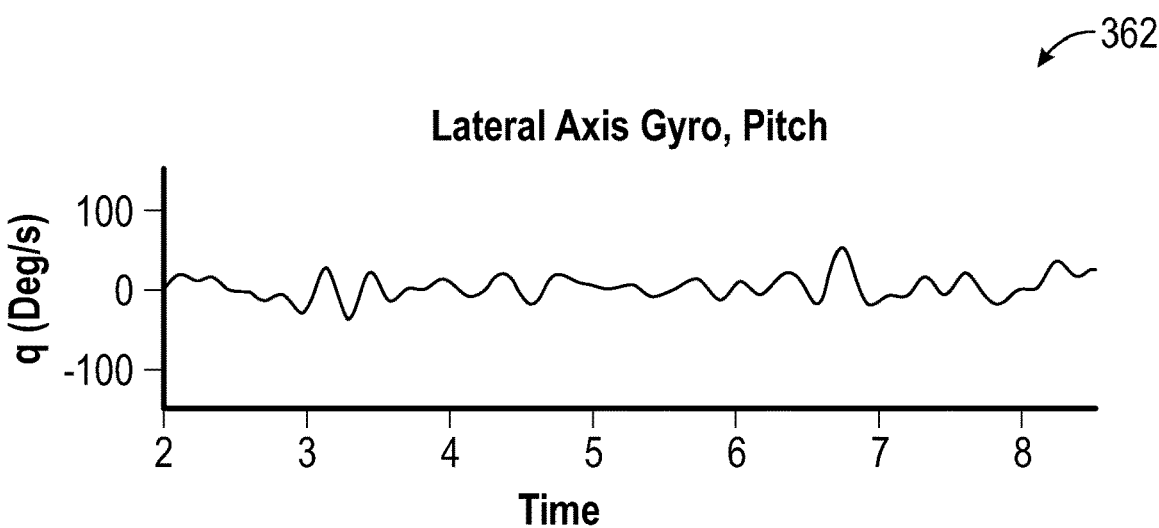
Figure 30C:
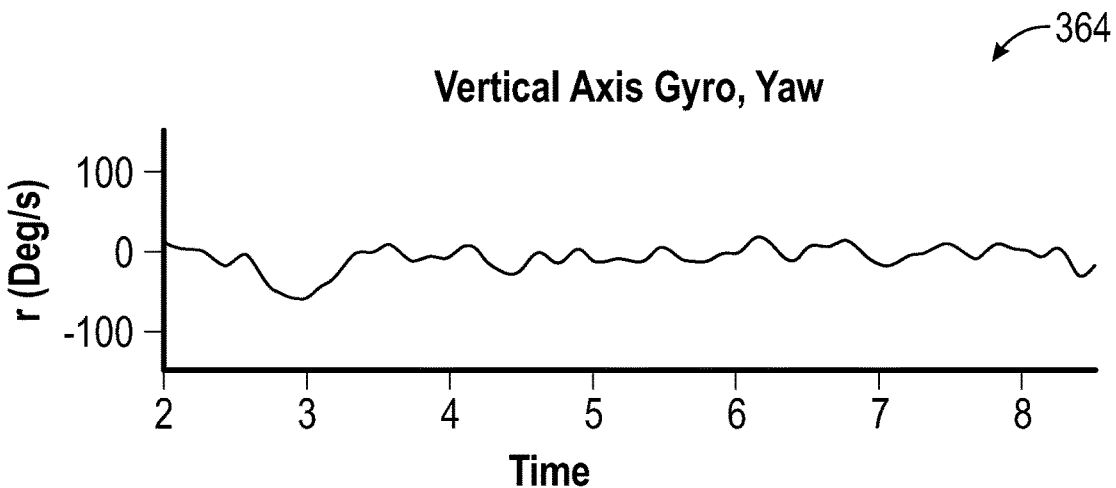
Figure 31A:
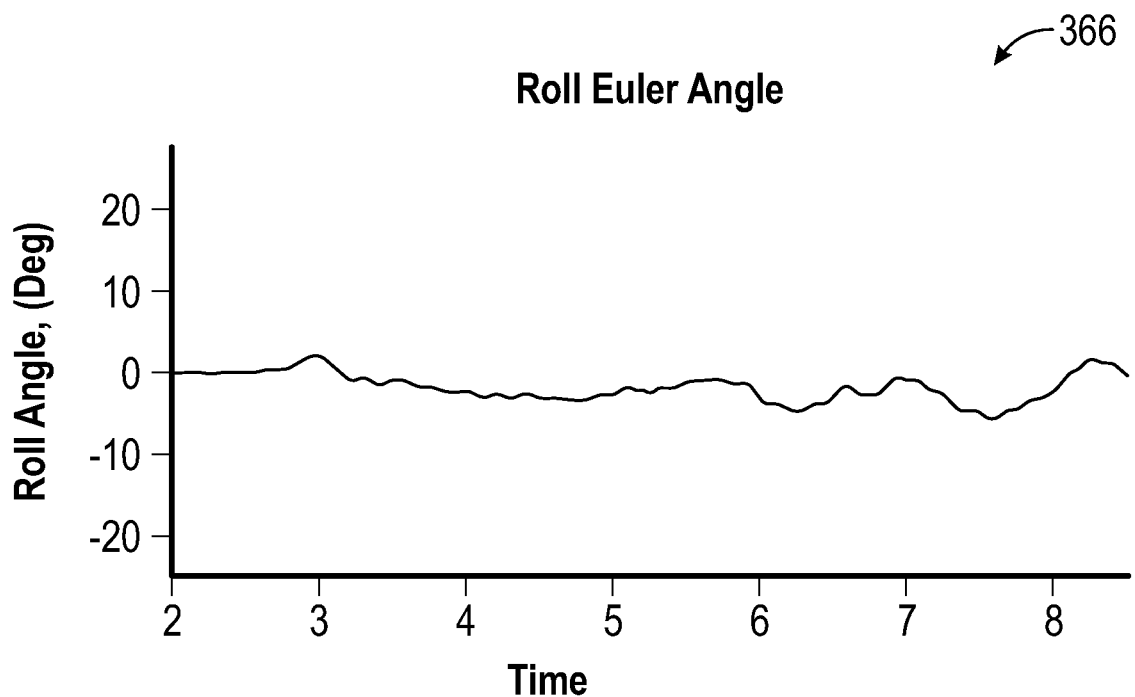
FIGS. 31$a$ and 31$b$ are graphs illustrating Euler angles of roll and pitch, respectively, of the cycloidal rotor MAV of FIG. 3 during hovering flight.
Figure 31B:
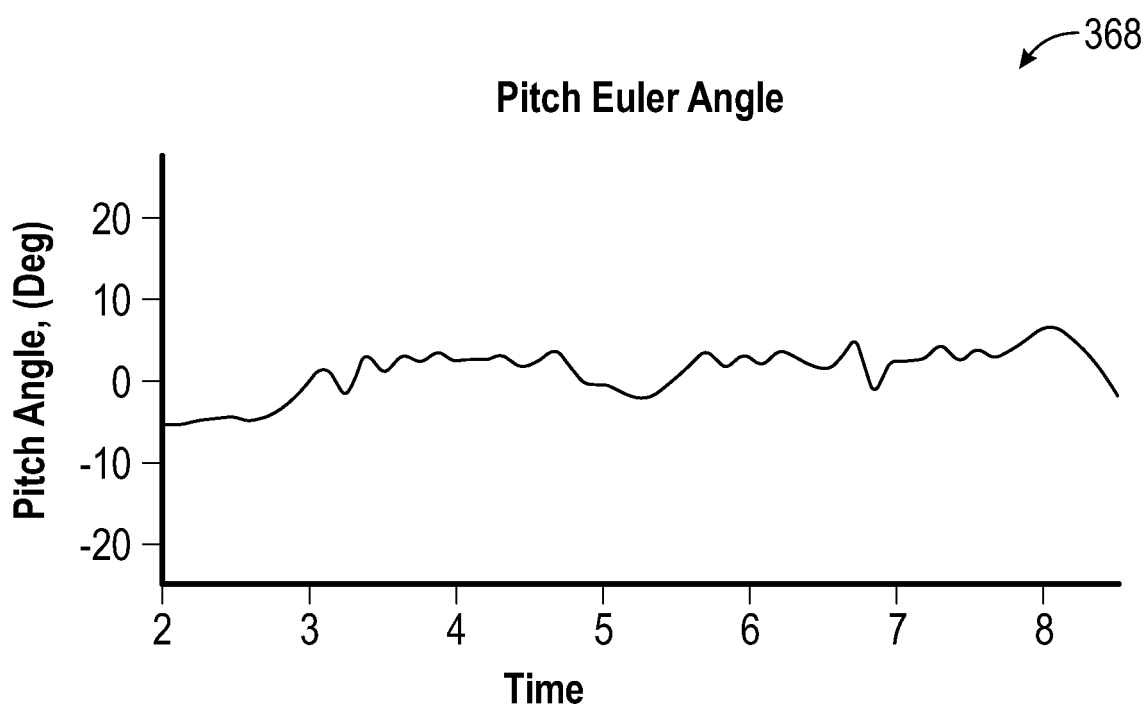

In this embodiment, attitude stabilization of cycloidal rotor MAV 100 is implemented onboard using autopilot 300, which comprises of a custom-built, embedded processor-sensor board, as shown schematically in FIG. 29. In this embodiment, autopilot 300 weighs approximately 1.3 grams and is powered by a single 1-cell 3.7 volt 30 mAh Li-Po battery. In this embodiment, autopilot 300 houses an STM32 microprocessor provided by STMicroelectronics with a 32-bit ARM Cortex M3 core for high-end onboard computation tasks. An MPU-9150™ inertial measurement unit (IMU) provided by InvenSense® is integrated on the board includes tri-axial gyroscopes, accelerometers, and magnetometers. In this embodiment, wireless communications are serviced by an on-board nRF24L01 chip, a low-power 2.4 GHz RF transceiver. In this embodiment, autopilot 300 has a sensor update rate of 500 Hz and is capable of streaming vehicle attitude data and actuator controls data to an off-board base station 350 shown in FIG. 29) with a short latency. The autopilot 300 is capable of sensing vehicle attitude and angular rates and sending corrective signals to the servos for stabilization by varying the pulse width input to the motors and servos. In other embodiments, the physical components and functionalities provided by autopilot 300 may vary from the embodiment of autopilot 300 described above.

In this embodiment, to communicate wirelessly with the onboard controller or autopilot 300, an operator of cycloidal rotor MAV 100 may use a LabVIEW interface which includes a wireless IEEE 802.15.4 data link. The base station 350 LabVIEW program allows the operator to control cycloidal rotor MAV 100, modify the feedback gains, change the sensitivity of pilot inputs, and record attitude data transmitted by the onboard processor. In some embodiments, the LabVIEW program may receive pilot inputs through the use of a commercially available DX6i transmitter provided by Spektrum which is hardwired to the base station 350, and features a user interface to collect the feedback gains and pilot sensitivity specifications. In some embodiments, the program may connect to the microcontroller through a wireless 2.4 GHz radio link and uses this connection to send the control inputs and receive cycloidal rotor MAV 100 attitude and rates data. In this embodiment, the data processing and inner-loop feedback control calculations are performed onboard by the microprocessor of autopilot 300.

Figure 28:
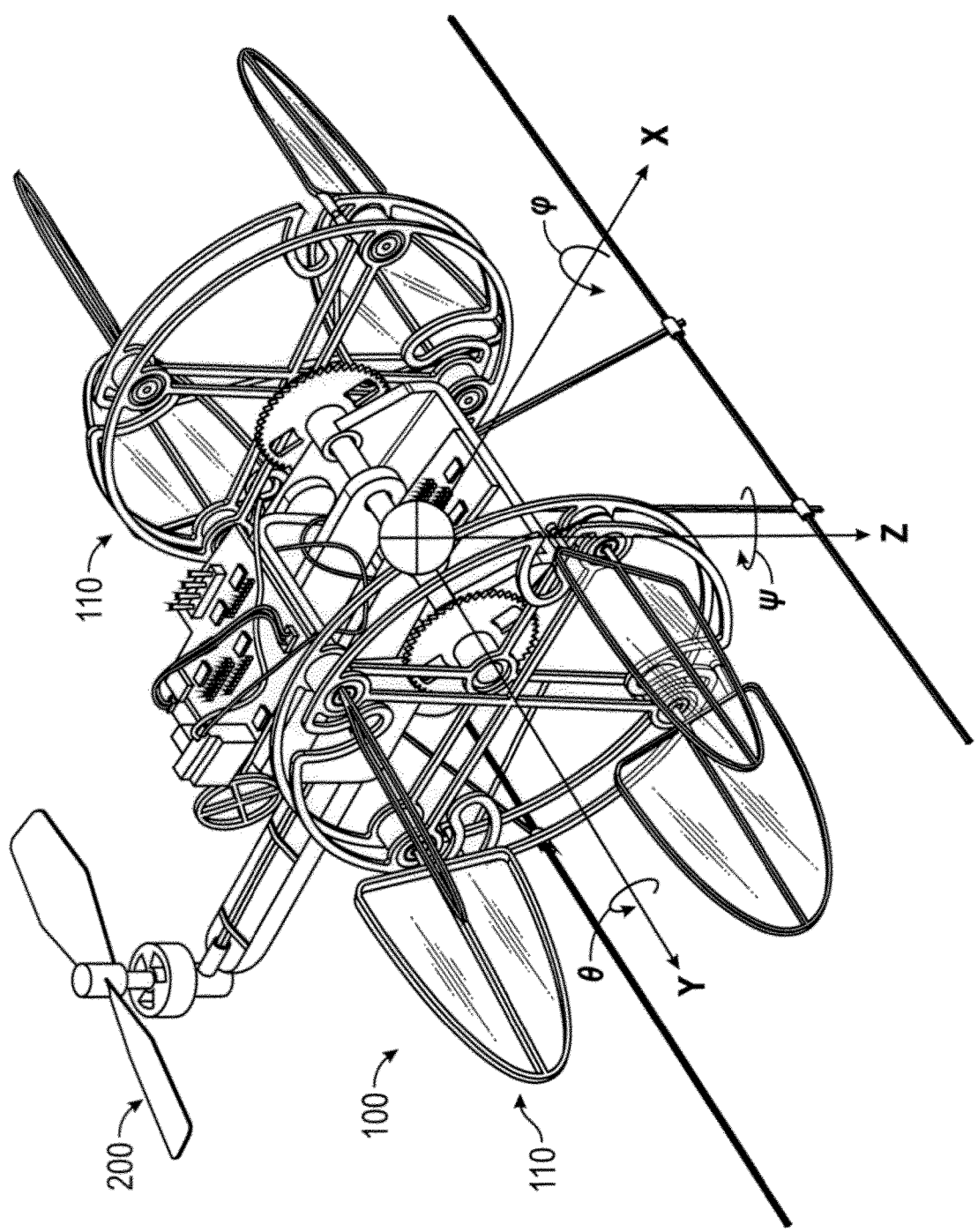
FIG. 28 is a perspective view illustrating a body-fixed frame and axes of roll, pitch, and yaw of the cycloidal rotor MAV of FIG. 3.

In this embodiment, the on-board gyros of autopilot 300 measure the pitch (q), roll (p) and yaw (r) angular rates while the accelerometers record the tilt of the gravity vector in the body frame of cycloidal rotor MAV 100. The body-fixed frame directions and rates of cycloidal rotor MAV 100 are indicated in FIG. 28. The attitude of cycloidal rotor MAV 100 can then be extracted by integrating the gyro measurements with time via autopilot 300. However, this may lead to drift in attitude measurements. Accelerometers, on the other hand, offer stable bias, but may be sensitive to vibrations and in general offer poor high frequency information. Therefore, in this embodiment, a complementary filter is incorporated in autopilot 300 to extract the pitch and roll Euler angles using a high-pass filter for the gyros (4 Hz cut-off) and a low-pass filter for accelerometers (6 Hz cut-off). The rotational vibrations are filtered out since they are sufficiently higher than the body dynamics. In this embodiment, on-board inner loop feedback 302 is implemented using a proportional-derivative (PD) controller 304 of autopilot 300, as shown in FIG. 29. The feedback states are the pitch and roll Euler angles $\theta$ and $\phi$, and the attitude rates, p, q and r. An outer loop feedback 306 capability of autopilot 300 is provided for translational positioning by a human pilot or for a position tracking system. In this embodiment, inner loop feedback 302 has a loop time of approximately 3 milliseconds (ms) while outer loop feedback 306 has a loop time of approximately 10 ms; however, in other embodiments, the loop times of the inner loop feedback 302 and outer loop feedback 306 of autopilot 300 may vary. In still other embodiments, control of cycloidal rotor MAV 100 may be effectuated in ways that differ from those described above with respect to the embodiment of cycloidal rotor MAV 100 shown in FIGS. 4 and 25-29.

Referring to FIGS. 4 and 25-31c, for flight testing the embodiment of cycloidal rotor MAV 100 shown in FIG. 4 an 8 ft×8 ft×8 ft safe enclosure (not shown) was utilized. In the embodiment of FIGS. 4 and 25-31c, the sides of the enclosure were covered by a 90 micron thick plastic sheet to retain cycloidal rotor MAV 100 in the enclosure during flying and offer a soft impact should cycloidal rotor MAV 100 collide with the walls. Additionally, a sheet of plastic suspended from the edges of the frame a few inches off the ground provided protection to cycloidal rotor MAV 100 in the case of a crash landing. During the flight testing conducted in this embodiment, cycloidal rotor MAV 100 took off from the center of the suspended sheet which provided a stable platform for vehicle lift-off.

In this embodiment, the feedback method used to stabilize cycloidal rotor MAV 100 during flight testing was an experimentally tuned PD controller which stabilized cycloidal rotor MAV 100 about a set point. Thus, cycloidal rotor MAV 100 was trimmed about the desired flight condition in order to appropriately utilize the controller feedback. For the initial flight tests, the desired flight condition was hovering flight; therefore, effort was focused toward modifying the direction of the individual thrust vectors from the main cycloidal rotor assemblies 110 until the thrust force was vertical. Additionally, ensuring the thrust vectors are vertical also decouples the yaw and roll trim inputs. To accomplish this, in this embodiment, the motor 402 outputs of the cycloidal rotor MAV 100 were adjusted so that one cycloidal rotor assembly 110 would spin much faster than the other. In this configuration, the cycloidal rotor assembly 110 is then the primary source of lift for cycloidal rotor MAV 100 and any yawing behavior cycloidal rotor MAV 100 experiences is predominantly caused by the faster cycloidal rotor assembly 110. In other embodiments, the on-board control algorithm may vary.

In this embodiment, by observing cycloidal rotor MAV 100, the trim of the appropriate servo 404 of the cycloidal rotor MAV 100 was adjusted until cycloidal rotor MAV 100 no longer yawed. The servo was set to each extreme to ensure that there was enough control authority. Then the bisection method was used to converge on the point where the thrust vector was vertical. Once each cycloidal rotor assembly 110 of cycloidal rotor MAV 100 was adjusted in this manner the thrust vectors of the cycloidal rotor assemblies 110 were nearly vertical. In this embodiment, the next step of trimming cycloidal rotor MAV 100 included trimming for eliminating roll. This was done by introducing a constant offset in RPM between each cycloidal rotor assembly 110. Additionally, throttle offset was corrected for the tail rotor assembly 200 of the cycloidal rotor MAV 100 so as to ensure the tail rotor assembly 200 generated enough thrust to balance out the moment generated by the rotating cycloidal rotor assemblies 110 and supplement the lifting force provided therefrom. In this embodiment, after these steps were complete, cycloidal rotor MAV 100 was tested by hopping it to make sure it lifted off vertically in a stable fashion. Additionally, minor adjustments (e.g. forwards and backwards trim, pitch, and roll) were made to further trim cycloidal rotor MAV 100.

In this embodiment, after successfully trimming cycloidal rotor MAV 100 for hovering flight, feedback gains were introduced in the cycloidal rotor MAV 100 (e.g., via PD controller 304 of the autopilot 300) in order to provide the additional level of control necessary beyond a human pilot's capability in order to stabilize cycloidal rotor MAV 100. For flight testing with on-board stabilization, only roll and pitch damping (derivative) gains were initially introduced which allowed cycloidal rotor MAV 100 to achieve a marginal level of stability in this embodiment. No yaw gains were necessary as part of this procedure. The derivative gains of autopilot 300 had the effect of slowing down cycloidal rotor MAV 100 dynamics and allowing for further trimming of cycloidal rotor MAV 100. However, in this embodiment, proportional gains were introduced to eliminate drift. These were added in slowly until cycloidal rotor MAV 100 behaved as expected, and then the derivative gains were slightly adjusted to improve hover stability. The associated gyro data and Euler angles for the flight are provided in graphs 360, 362, and 364 of FIGS. 30a, 30b, and 30c, respectively, and graphs 366 and 368 of FIGS. 31a, 31b, respectively. The onboard feedback control system of autopilot 300 was able to restrict the angular rates and cycloidal rotor MAV 100 did not deviate from level flight by more than ±10 degrees in roll or pitch. The large spike around 7 seconds in the roll gyro graph 366 (shown in FIG. 31a) and the associated smaller spike in the pitch gyro graph 368 (shown in FIG. 31b) are when the throttle is reduced for landing. In this embodiment, cycloidal rotor MAV 100 is able to perform stable hovering flight using active onboard feedback stabilization.

As described above, the advantages of employing a cycloidal thrust generation mechanism via cycloidal rotor MAV 100 instead of a traditional helicopter rotor include the possibility for much greater aerodynamic efficiency, agility, maneuverability, and gust tolerance. Thus, it is of interest to reduce the size of the vehicle to the smallest scale possible for improved reconnaissance and surveillance for indoor scenarios. For this particular design, a cycloidal rotor assembly 110 with a single endplate (i.e., frames 112 and 118) and cantilevered, elliptical blades 150 were developed for the embodiment of cycloidal rotor MAV 100 described herein. Through a systematic testing procedure via testing system 600, the design of blades 150 was optimized and a specialized manufacturing technique was created to reliably produce strong, lightweight blades via molding system 500. The embodiment of cycloidal rotor assemblies 110 described herein and shown particularly in FIGS. 5-7 have a unique design, which takes advantage of the small scale to achieve higher thrust/weight ratios compared to previous cycloidal rotor designs. The blade manufacturing process provided by the molding system 500 described herein and shown particularly in FIGS. 8-12 allows ultra-lightweight blades 150 to be fabricated with consistent quality and physical properties. Using the custom-built miniature three-component balance 602 of the testing system 600 shown in FIG. 13, experimental parametric studies were conducted to optimize the performance of cycloidal rotor assemblies 110. Using an inner stabilization loop 302 of autopilot 300, as described herein and shown in FIG. 29, cycloidal rotor MAV 100 has been able to achieve stable hovering flights. This demonstrated the downwards scalability of this revolutionary flying concept. The cyclocopter at these scales (e.g., cycloidal rotor MAV 100 described herein) requires low latency between state measurements and control outputs due to the inherently fast vehicle dynamics.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A cycloidal rotor air vehicle, comprising:
   an airframe;
   a first cycloidal rotor assembly supported by the airframe and configured to rotate about a first axis of rotation relative to the airframe, the first cycloidal rotor assembly comprising a rotor frame and a plurality of blades spaced circumferentially around the first axis of rotation, each blade having a longitudinal axis oriented parallel to the first axis of rotation and extending between a root and a longitudinally opposed tip and a pitch rod that is offset from the longitudinal axis, wherein each blade is coupled to the rotor frame by a separate root rod extending longitudinally from the root thereof to cantilever the blade to the rotor frame;
   a first motor configured to rotate the first cycloidal rotor assembly about the first axis of rotation;

a first servo coupled to each of the plurality of blades of the first cycloidal rotor assembly, wherein the first servo is configured to adjust the pitch of each of the plurality of blades in response to activation of the first servo;

an offset link having a first end pivotably coupled to an output of the first servo and a second end opposite the first end;

a plurality of pitch links, wherein each pitch link has a first end pivotably coupled to the second end of the offset link and a second end opposite the first end pivotably coupled to the pitch rod of a separate blade of the plurality of blades, wherein the plurality of pitch links are configured to adjust the pitch of the plurality of blades in response to rotation of the offset link by the first servo; and a control system supported on the airframe and configured to control the operation of the first motor and the first servo.

2. The cycloidal rotor air vehicle of claim 1, wherein the cycloidal rotor air vehicle has a total mass less than 200 grams.

3. The cycloidal rotor air vehicle of claim 1, wherein at least one of the plurality of blades of the first cycloidal rotor assembly comprises a material formed from unidirectional pre-impregnated carbon fiber.

4. The cycloidal rotor air vehicle of claim 1, wherein at least one of the plurality of blades of the first cycloidal rotor assembly comprises:

a blade frame including a central main spar and semi-elliptical outer frame; and a polyester skin covering the blade frame.

5. The cycloidal rotor air vehicle of claim 1, further comprising:

a second cycloidal rotor assembly supported by the airframe and configured to rotate about a second axis of rotation relative to the airframe, wherein the second cycloidal rotor assembly comprises a blade having a longitudinal axis oriented parallel to the second axis of rotation of the second cycloidal rotor assembly;

a second motor configured to rotate the second cycloidal rotor assembly about the second axis of rotation; and a second servo coupled to the blade of the second cycloidal rotor assembly and configured to adjust the pitch of the blade of the second cycloidal rotor assembly.

6. The cycloidal rotor air vehicle of claim 5, wherein the second axis of rotation is coaxial with the first axis of rotation.

7. The cycloidal rotor air vehicle of claim 6, further comprising:

a tail rotor assembly coupled to the airframe and configured to counter-balance pitch torque generated by the first cycloidal rotor assembly and the second cycloidal rotor assembly;

wherein the first motor is configured to rotate the first cycloidal rotor assembly in a first rotational direction about the first axis of rotation;

wherein the second motor is configured to rotate the second cycloidal rotor assembly in the first rotational direction about the second axis of rotation.

8. The cycloidal rotor air vehicle of claim 1, wherein the first cycloidal rotor assembly comprises four blades, wherein each blade of the first cycloidal rotor assembly has a longitudinal axis oriented parallel to the first axis of rotation.

9. A cycloidal rotor air vehicle, comprising:
an airframe;

a first cycloidal rotor assembly supported by the airframe and configured to rotate about a first axis of rotation, the first cycloidal rotor assembly comprising a blade having a longitudinal axis parallel with the first axis of rotation, wherein the blade has a longitudinal axis and comprises an outer frame which extends continuously about the entire perimeter of the blade, a root rod extending from the outer frame parallel with the longitudinal axis, and a pitch rod that extends from the outer from parallel with, but offset from, the longitudinal axis and the root rod; and a first motor configured to rotate the first cycloidal rotor assembly about the first axis of rotation;

wherein the outer frame of the blade of the first cycloidal rotor assembly comprises a material formed from unidirectional pre-impregnated carbon fiber.

10. The cycloidal rotor air vehicle of claim 9, wherein the blade of the first cycloidal rotor assembly comprises:

a central main spar and the outer frame which is semi-elliptical; and a polyester skin covering the main spar and the outer frame.

11. The cycloidal rotor air vehicle of claim 9, further comprising:

a first servo coupled to the blade of the first cycloidal rotor assembly and configured to adjust the pitch of the blade; and a control system supported on the airframe and configured to control the operation of the first motor and the first servo.

12. The cycloidal rotor air vehicle of claim 11, further comprising an offset link coupled to the first servo, and a pitch link extending between the offset link and the blade of the first cycloidal rotor assembly, wherein the pitch link is configured to adjust the pitch of the blade in response to rotation of the offset link by the first servo.

13. The cycloidal rotor air vehicle of claim 11, wherein the control system is configured to provide on-board inner loop feedback using a proportional-derivative controller.

14. The cycloidal rotor air vehicle of claim 9, further comprising a tail rotor assembly coupled to the airframe and configured to counter-balance pitch torque generated by the first cycloidal rotor assembly.

15. A method for forming a cycloidal rotor air vehicle, comprising:

(a) laying a strip of unidirectional pre-impregnated carbon fiber onto a mold;

(b) clamping first and second plates against the pre-impregnated carbon fiber to push the pre-impregnated carbon fiber into the mold;

(c) curing the pre-impregnated carbon fiber in the mold to form a rotor blade of the cycloidal rotor air vehicle; and (d) forming the strip of unidirectional pre-impregnated carbon fiber into an outer frame that extends continuously about the entire perimeter of the formed rotor blade.

16. The method of claim 15, wherein the mold is formed from polytetrafluoroethylene.

17. The method of claim 15, further comprising:

(e) placing a silicone mat onto the mold to distribute pressure across the pre-impregnated carbon fiber following (b).

18. The method of claim 15, further comprising:

(e) pivotably coupling the rotor blade to a rotor assembly of the cycloidal rotor air vehicle with a pitch linkage;

(f) coupling a servo to the rotor assembly to control the pitch of the rotor blade; and (g) coupling a motor to the rotor assembly to rotate the rotor assembly about an axis of rotation.

19. The method of claim 15, wherein the mold comprises a polytetrafluoroethylene female mold half and a silicon male mold half.

20. The cycloidal rotor air vehicle of claim 9, wherein the blade comprises a central spar extending longitudinally through the outer frame of the blade.

\* \* \* \* \*